US011042976B2

(12) United States Patent
He

(10) Patent No.: US 11,042,976 B2
(45) Date of Patent: Jun. 22, 2021

(54) IMAGE INSPECTION APPARATUS

(71) Applicant: Keyence Corporation, Osaka (JP)

(72) Inventor: Di He, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 71 days.

(21) Appl. No.: 16/729,529

(22) Filed: Dec. 30, 2019

(65) Prior Publication Data
US 2020/0250801 A1    Aug. 6, 2020

(30) Foreign Application Priority Data

Feb. 1, 2019    (JP) .............................. JP2019-017150

(51) Int. Cl.
*G06T 7/00*    (2017.01)

(52) U.S. Cl.
CPC .... *G06T 7/001* (2013.01); *G06T 2207/20076* (2013.01); *G06T 2207/20081* (2013.01); *G06T 2207/20092* (2013.01); *G06T 2207/30108* (2013.01)

(58) Field of Classification Search
CPC . B60Y 2400/408; F16H 55/563; F16H 61/30; F16H 63/065; F16H 9/18; G06T 2207/10024; G06T 2207/20076; G06T 2207/20081; G06T 2207/20084; G06T 2207/20092; G06T 2207/30108; G06T 7/0008; G06T 7/001

See application file for complete search history.

(56) References Cited

U.S. PATENT DOCUMENTS

| | | | | |
|---|---|---|---|---|
| 2002/0168099 | A1* | 11/2002 | Noy | G06T 7/0002 382/149 |
| 2013/0177232 | A1* | 7/2013 | Hirano | G06T 7/0004 382/141 |
| 2017/0069075 | A1* | 3/2017 | Okuda | G06T 11/60 |
| 2017/0358071 | A1* | 12/2017 | Yamaoka | G06K 9/46 |

FOREIGN PATENT DOCUMENTS

| | | |
|---|---|---|
| JP | 2013120550 A | 6/2013 |
| JP | 2018005640 A | 1/2018 |

OTHER PUBLICATIONS

U.S. Appl. No. 16/729,531, filed Dec. 30, 2019 (158 pages).
U.S. Appl. No. 16/729,532, filed Dec. 30, 2019 (155 pages).

* cited by examiner

*Primary Examiner* — Bobbak Safaipour
(74) *Attorney, Agent, or Firm* — Kilyk & Bowersox, P.L.L.C.

(57) ABSTRACT

To suppress erroneous input in inputting a non-defective product image and a defective product image, thereby increasing accuracy of distinguishing between a non-defective product image and a defective product image. An additional image that is added with an attribute as either one of a non-defective product and a defective product by a user is plotted in a feature space, and the probability that the attribute of the additional image is wrong is estimated. In the case in which the additional image is expected to have a wrong attribute, this result is notified. Result of selection whether to correct the attribute of the additional image by a user who receives the notification is received. A classifier generator 22 determines the attribute of the additional image on the basis of the result of selection and corrects a classification boundary in accordance with the determined attribute.

9 Claims, 38 Drawing Sheets

DISTANCE FROM A DATA POINT "A" = $(x_1, x_2, \ldots, x_m)$ TO A HYPERPLANE $f(x) = w^T x + \theta$ $$d = \frac{|w^T x + \theta|}{\|w\|}$$

FIG. 33
NON-DEFECTIVE PRODUCT IMAGE
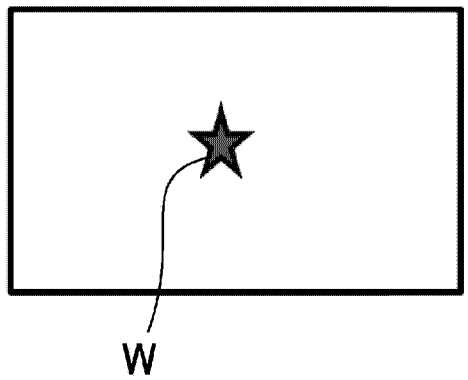
W
DEFECTIVE PRODUCT IMAGE
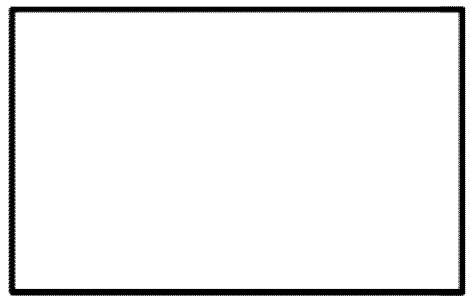
EXTRACT A DIFFERENCE
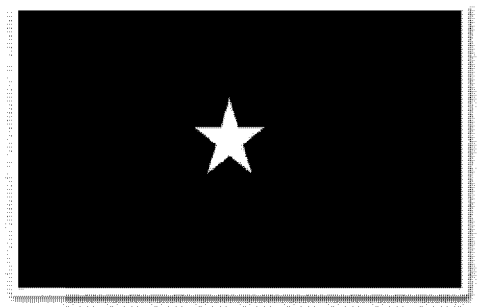
SET AN INSPECTION WINDOW
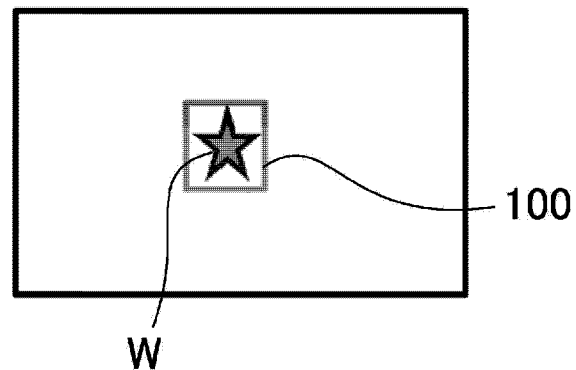
100
W FIG. 37
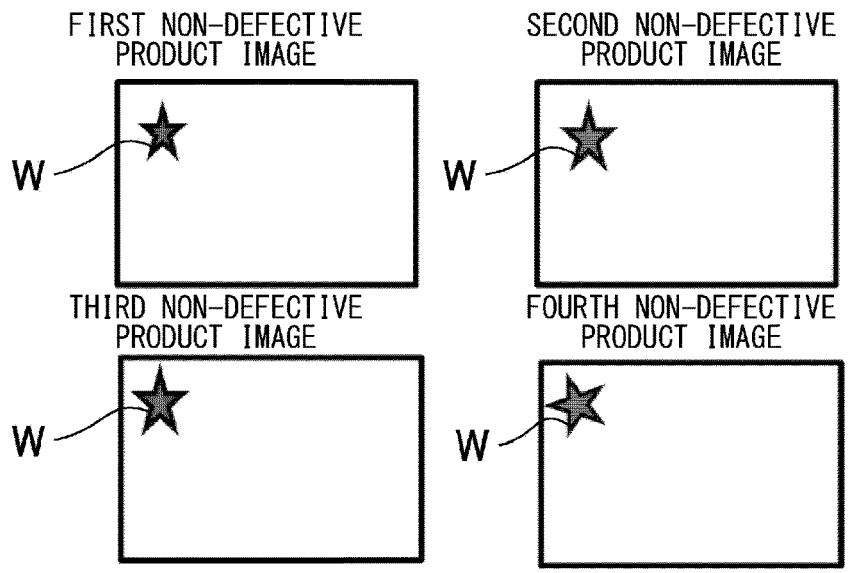
DEFECTIVE PRODUCT IMAGE
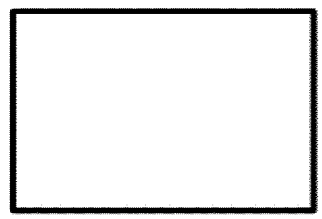
EXTRACT A DIFFERENCE
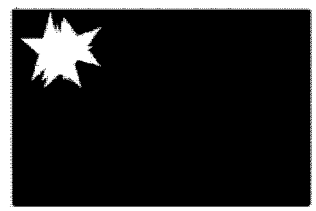
SET AN INSPECTION WINDOW
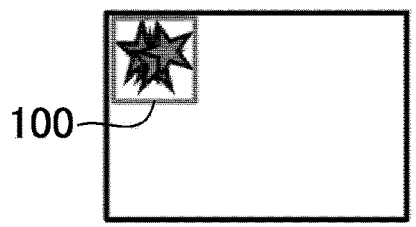

FIG. 39
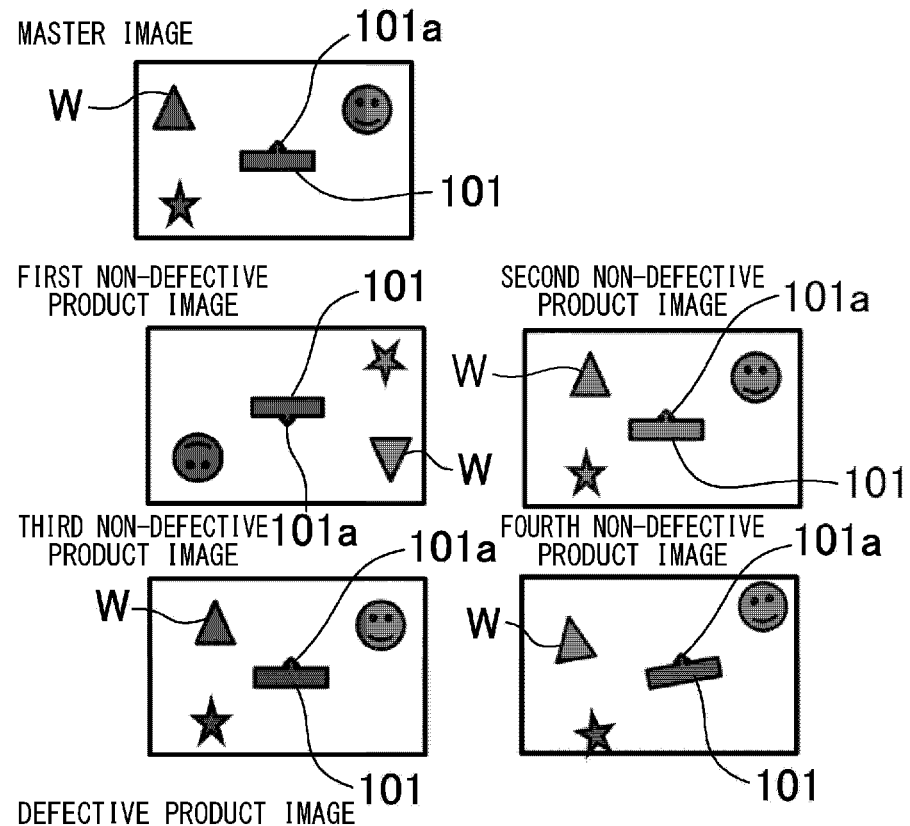
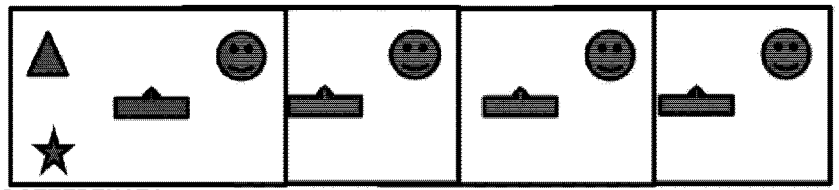
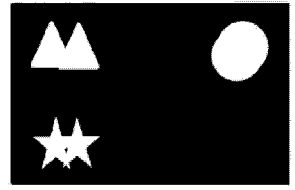
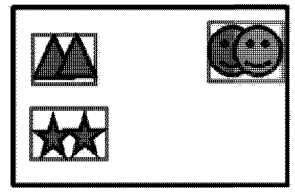

IMAGE INSPECTION APPARATUS

CROSS-REFERENCE TO RELATED APPLICATIONS

The present application claims foreign priority based on Japanese Patent Application No. 2019-017150, filed Feb. 1, 2019, the contents of which is incorporated herein by reference.

BACKGROUND OF THE INVENTION

1. Field of the Invention

The present invention relates to an image inspection apparatus that performs pass/fail determination of an inspection object on the basis of a captured image of the inspection object, and in particular, the present invention belongs to the technical field of architecture using a learning processor.

2. Description of Related Art

Conventional image inspection apparatuses are configured to perform pass/fail determination of an inspection object by comparing a threshold with a feature that is extracted from a captured image of the inspection object (e.g., JP-A-2013-120550). The feature for the inspection, such as color or an edge and the threshold for the pass/fail determination are set by a user. The pass/fail determination is easily performed with respect to an image containing a feature that is clearly imaged, such as color or an edge. On the other hand, as for an inspection object with many color irregularities and an inspection object of which an edge state tends to vary, such as a metal component, a feature tends to vary depending on imaging conditions and other factors. This may make it difficult to perform the pass/fail determination by using an image inspection apparatus and may cause unstable determination result, although the pass/fail determination is easily performed in a visual inspection with human eyes.

On the other hand, a technique for making a learning processor distinguish whether a newly input inspection object image is a non-defective product image or a defective product image is publicly known. The learning processor may be a publicly known learning processor, such as neural network, and is preliminarily made to learn features in each of a non-defective product image containing a non-defective product and a defective product image containing a defective product.

For example, this technique is disclosed in JP-A-2018-5640.

The use of a learning processor, as in the case of an apparatus disclosed in JP-A-2018-5640, eliminates the need for a user to set a feature or a threshold to be used in inspection and enables automatic selection and generation of a feature and a threshold that are effective for distinguishing between a non-defective product and a defective product, in the device.

However, as in the case of learning by human, it is difficult to correctly distinguish unless experience and knowledge are obtained in advance, in machine learning. The distinguishing accuracy of machine learning depends on whether an appropriate non-defective product image and an appropriate defective product image are learned. A user may mistakenly input a non-defective product image as a defective product image, or conversely, input a defective product image as a non-defective product image, in a process of inputting a non-defective product image and a defective product image, and each case causes decrease in distinguishing accuracy.

SUMMARY OF THE INVENTION

The present invention has been made in view of these circumstances, and an object of the present invention is to suppress erroneous input in inputting a non-defective product image and a defective product image, thereby increasing accuracy of distinguishing between a non-defective product image and a defective product image.

To achieve the above-described object, a first aspect of the invention provides an image inspection apparatus for performing pass/fail determination of an inspection object on the basis of an image obtained by imaging the inspection object. The image inspection apparatus includes an image input unit, a classifier generator, a notification unit, and a selection unit. The image input unit is configured to input a non-defective product image group and a defective product image group. The non-defective product image group is composed of multiple non-defective product images added with an attribute as a non-defective product by a user. The defective product image group is composed of defective product images added with an attribute as a defective product by the user. The classifier generator is configured to input the non-defective product image group and the defective product image group, which are input by the image input unit, to a learning processor with a multi-layered structure. The classifier generator is also configured to plot the non-defective product image group and the defective product image group in a feature space and to set a classification boundary between the non-defective product image group and the defective product image group plotted in the feature space, thereby generating a classifier for distinguishing between a non-defective product image and a defective product image. The notification unit is configured to, in a case in which an additional image that is added with an attribute as either one of a non-defective product and a defective product is newly input to the learning processor by the user, and the additional image is plotted in the feature space, estimate the probability that the attribute of the additional image is wrong, on the basis of a distance between the position of the additional image in the feature space and the classification boundary or a representative point of the images with the other attribute. The notification unit is further configured to provide a notification of the probability of wrong attribute of the additional image when the attribute of the additional image is expected to be wrong. The selection unit is configured to receive result of selection whether to correct the attribute of the additional image, by the user who receives the notification of the probability of wrong attribute of the additional image, from the notification unit. The classifier generator is configured to determine the attribute of the additional image on the basis of the result of selection received by the selection unit and to correct the classification boundary in accordance with the determined attribute.

With this configuration, the non-defective product image group and the defective product image group, which are input by the image input unit, are then input to the learning processor and are machine learned. The machine learned non-defective product image group and defective product image group are plotted in a feature space, whereby a classification boundary is set between the non-defective product image group and the defective product image group in the feature space. Thus, a classifier for distinguishing between a non-defective product image and a defective product image is generated.

Thereafter, when a user input an additional image to the learning processor, the additional image is plotted in the feature space. The additional image is added with an attribute as either one of a non-defective product and a defective product, but this attribute is added by a user and may be wrong. In this configuration, the probability that the attribute added to the additional image by a user is wrong is estimated on the basis of a distance between the position of the additional image in the feature space and the classification boundary or a representative point of the images with the attribute other than the attribute of the additional image. As a result of the estimation, in the case in which the attribute of the additional image is expected to be wrong, this result is notified. A user who receives this notification is allowed to select whether to correct the attribute added to the additional image. Thus, inputting a defective product image as a non-defective product image, and conversely, inputting a non-defective product image as a defective product image, are suppressed. The attribute of the additional image is finally determined on the basis of the result of selection, and the classification boundary in the feature space is corrected in accordance with the finally determined attribute, thereby increasing the accuracy of distinguishing between a non-defective product image and a defective product image.

Even when the attribute of the additional image added by a user is expected to be wrong, the attribute may be actually right. For this reason, instead of changing the attribute immediately in response to the result of estimation, a user is allowed to select the attribute to correct error of the result of estimation.

According to a second aspect of the invention, the notification unit may be configured to expect the probability that the attribute of the additional image is wrong in a case in which the distance between the position of the additional image in the feature space and the representative point of the images with the other attribute is less than a threshold.

That is, in a case in which the position of the additional image added with an attribute as either one of a non-defective product and a defective product, in the feature space is close to a representative point of the images with the other attribute, the attribute of the additional image is highly probably the other attribute, and therefore, the notification unit provides a notification. On the other hand, in a case in which the position of the additional image added with one of the attributes in the feature space is far from the representative point of the images with the other attribute, the attribute of the additional image is highly probably the one attribute, and therefore, the notification unit does not provide a notification. Thus, the accuracy of estimation is improved.

According to a third aspect of the invention, the representative point may be a point closest to the additional image, among the multiple images with the other attribute, which are plotted in the feature space.

This enables estimation of the probability that the attribute of the additional image is wrong, on the basis of a distance of the additional image from the representative point that is closest to the additional image, in a case in which multiple images with the other attribute are plotted in the feature space. Thus, the accuracy of estimation is improved.

According to a fourth aspect of the invention, the representative point may be a centroid of the multiple images with the other attribute, which are plotted in the feature space.

This enables estimation of the probability that the attribute of the additional image is wrong, on the basis of a distance of the additional image from the representative point that is a centroid of multiple images with the other attribute plotted in the feature space. Thus, the accuracy of estimation is improved.

According to a fifth aspect of the invention, the notification unit may be configured to expect the probability that the attribute of the additional image is wrong, in a case in which, compared with a distance between the position of the additional image in the feature space and a representative point of the images having an attribute as either one of a non-defective product and a defective product, the distance between the position of the additional image in the feature space and the representative point of the images with the other attribute is short.

That is, on the basis of three positions of the representative point of the images with the one attribute, the representative point of the images with the other attribute, and the additional image, in the feature space, the attribute is expected to be wrong when the position of the additional image in the feature space is closer to the representative point of the images with the other attribute than the representative point of the images with the one attribute. Using the three positions increases the accuracy of estimation.

According to a sixth aspect of the invention, in a case in which the attribute of the additional image is expected to be wrong, the notification unit may be configured to determine whether an image having a predetermined degree or more similarly relative to the additional image is already input by the image input unit and to not provide a notification when determining that the image is still not input.

For example, assuming that a new type of inspection object is to be registered, an image having a low similarity relative to an already input non-defective product image may be input as a non-defective product image. In such a case, the position of this additional image is far from the position of the image with the other attribute, and therefore, the attribute of the additional image may be expected to be wrong. In the configuration of the invention, even in the case in which the attribute of the additional image is expected to be wrong, notification is not provided unless an image similar to the additional image is still not input. Thus, a new type of inspection object is smoothly registered.

According to a seventh aspect of the invention, the notification unit may be configured to add a mark that shows the probability of erroneous registration, to the additional image that is expected to have a wrong attribute, and to provide a notification when another additional image is plotted in the feature space and a similarity between the another additional image and the additional image added with the mark is determined as being a predetermined degree or more.

With this configuration, a mark is added to the additional image in which the attribute is expected to be wrong, whereby the additional image that is expected to be mistakenly registered is distinguished from other additional image. Thereafter, when another additional image is input by a user and is plotted in the feature space, a similarity between the another additional image and the additional image added with the mark is determined. The similarity between the another additional image and the additional image added with the mark may be a predetermined degree or more, and the another additional image and the additional image added with the mark may be determined as being similar to each other. This means that multiple additional images in which the attribute is expected to be wrong are added. Thus, the result of estimation is highly probability right. In this case, a notification that the attribute of the additional image is expected to be wrong is provided, whereby erroneous registration is avoided.

According to an eighth aspect of the invention, the image inspection apparatus may further include a display unit configured to display the additional image added with the mark and the another additional image having the predetermined degree or more similarly relative to the additional image added with the mark, when the notification unit provides the notification.

This enables checking the multiple additional images that are expected to have a wrong attribute, at a time.

According to a ninth aspect of the invention, the notification unit may be configured to calculate a reliability on the basis of the distance between the position of the additional image in the feature space and the representative point of the images with the other attribute. The notification unit may be further configured to provide a notification that the additional image does not contribute to learning, which is performed by the learning processor, in a case in which the calculated reliability is less than a predetermined degree.

Specifically, a large number of additional images may be input in order to enhance learning performed by the learning processor. However, for example, in a case in which the additional images are similar to each other, the distance between the position of the additional image in the feature space and the representative point of the images with the other attribute may hardly change. In this situation, the reliability is low and is less than a predetermined degree, and therefore, the additional image hardly contributes to learning, which is performed by the learning processor. The notification notifies this state, thereby saving a user from inputting an unnecessary additional image.

In the present invention, the probability that the attribute of the additional image is wrong is estimated by using the feature space, and a notification is provided when the attribute of the additional image is expected to be wrong. The attribute of the additional image is finally determined by receiving correction of the attribute of the additional image, which is performed by a user who receives the notification. The classification boundary in the feature space is corrected on the basis of the finally determined attribute. Thus, erroneous input in inputting a non-defective product image and a defective product image is suppressed, thereby increasing accuracy of distinguishing between a non-defective product image and a defective product image.

BRIEF DESCRIPTION OF THE DRAWINGS

FIG. 33 is a diagram for explaining a procedure for automatically setting an inspection window in a single region;

FIG. 37 is a diagram for explaining the procedure for automatically setting an inspection window after multiple regions are superposed on one another;

FIG. 39 is a diagram for explaining the procedure in the case of performing the position correction process.

DESCRIPTION OF EMBODIMENTS

An embodiment of the present invention is explained in detail below with reference to the drawings. However, the following descriptions of the embodiment are substantially only illustrations and are not intended to limit the present invention, objects using the present invention, and use of the present invention.

Figure 1:
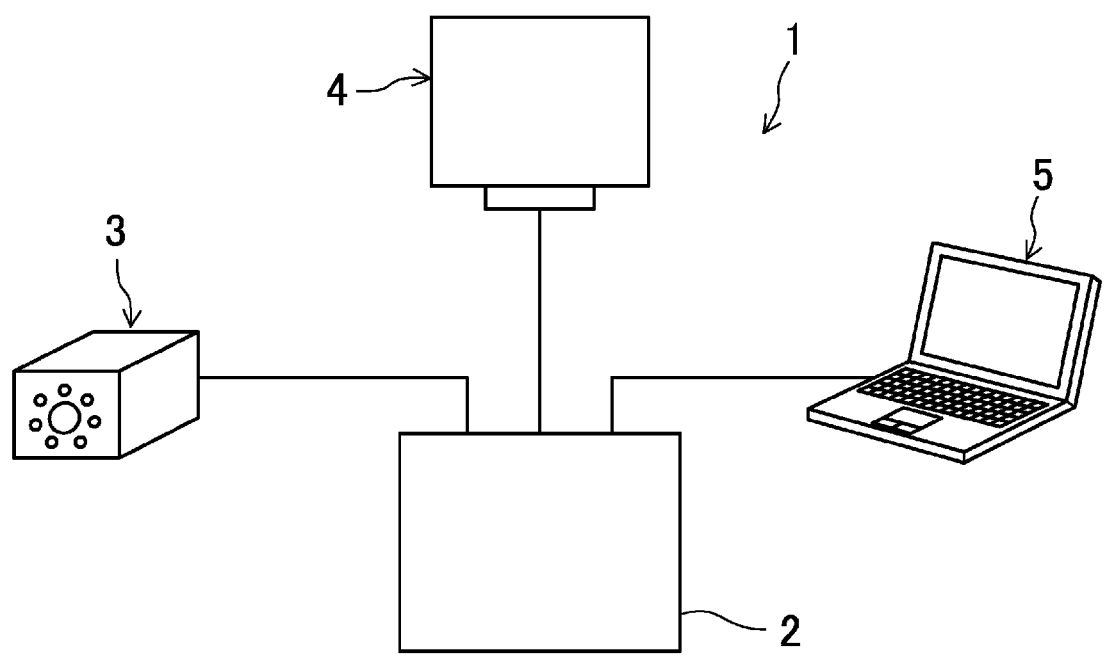
FIG. 1 is a schematic diagram showing a configuration of an image inspection apparatus according to an embodiment of the present invention.

FIG. 1 is a schematic diagram showing a configuration of an image inspection apparatus 1 according to an embodiment of the present invention. The image inspection apparatus 1 performs pass/fail determination of an inspection object on the basis of a captured image of the inspection object. The inspection object includes various types of parts and products, for example. The image inspection apparatus 1 can be used in a production site in a factory or other location, or other situation. The inspection object may be inspected as a whole or may be partially inspected. In addition, one inspection object may have multiple inspection targets. The image may contain multiple inspection objects.

The image inspection apparatus 1 includes a control unit 2 as an apparatus main body, an imaging unit 3, a display device or display unit 4, and a personal computer 5. The personal computer 5 is not essential and can be omitted. The personal computer 5 may be used instead of the display device 4 as a display unit. Although FIG. 1 shows the control unit 2, the imaging unit 3, the display device 4, and the personal computer 5 as separate components, as an example of a configuration of the image inspection apparatus 1, any of these components may be combined and integrated together. For example, the control unit 2 and the imaging unit 3 may be integrated together, or the control unit 2 and the display device 4 may be integrated together. Alternatively, the control unit 2 may be separated into multiple units and some of these units may be incorporated into the imaging unit 3 or the display device 4, or the imaging unit 3 may be separated into multiple units and some of these units may be incorporated into other unit.

Configuration of Imaging Unit 3

Figure 2:
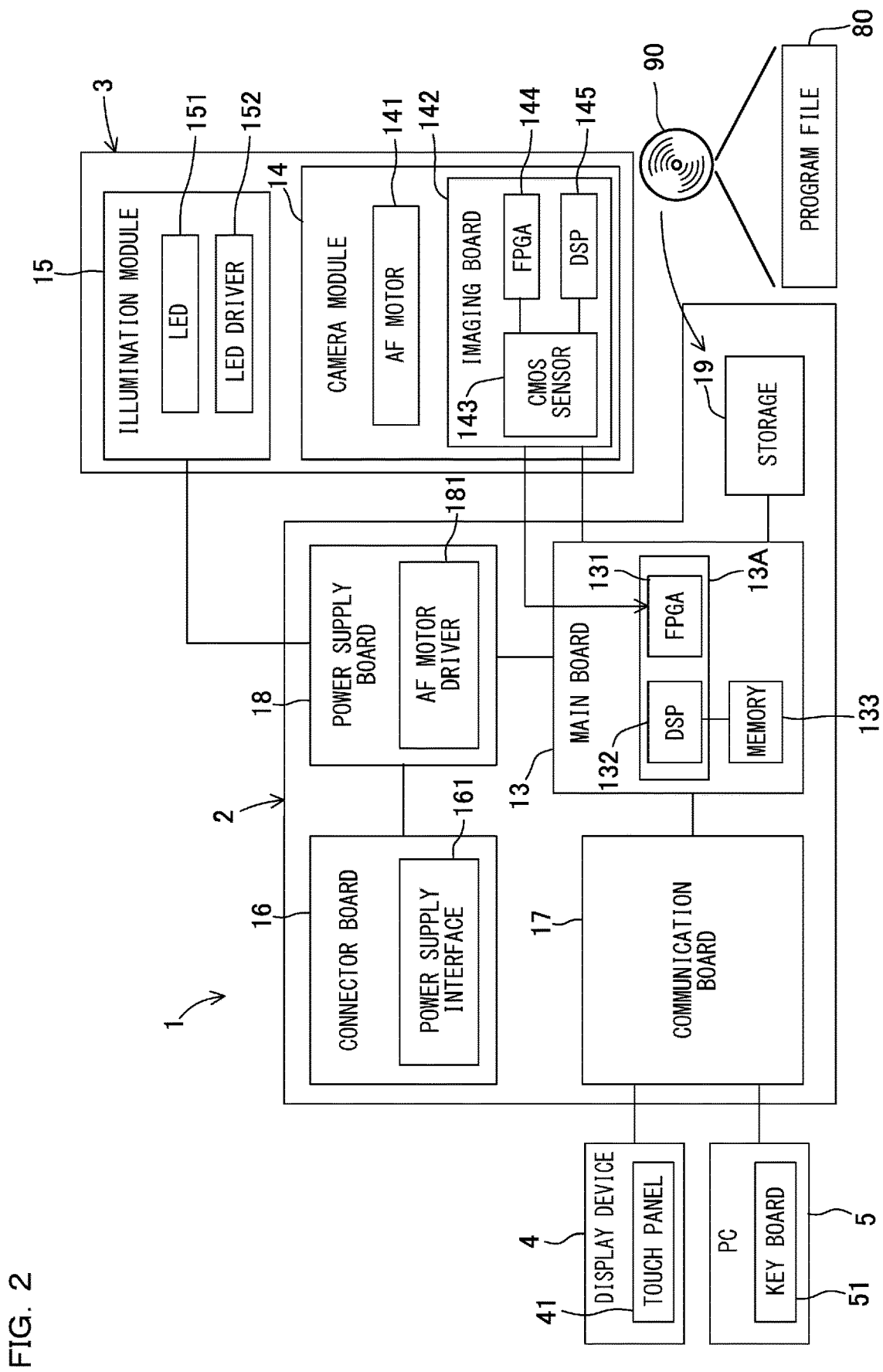
FIG. 2 shows a hardware configuration of the image inspection apparatus.

As shown in FIG. 2, the imaging unit 3 includes a camera module or imaging section 14 and an illumination module or illumination section 15. The camera module 14 includes an AF motor 141 for driving an imaging optical system and includes an imaging board 142. The AF motor 141 drives a lens of the imaging optical system to automatically adjust a focus. The focus can be adjusted by a conventionally known method such as a contrast autofocus. The imaging board 142 includes a CMOS sensor 143 as a light receiving element for receiving incident light from the imaging optical system, an FPGA 144, and a DSP 145. The CMOS sensor 143 is an imaging sensor configured to obtain a color image. A light receiving element such as a CCD sensor can also be used instead of the CMOS sensor 143. The FPGA 144 and the DSP 145 execute image processing in the imaging unit 3, and a signal output from the CMOS sensor 143 is input to the FPGA 144 and the DSP 145.

The illumination module 15 includes an LED (light emitting diode) 151, which is a light emitter for illuminating an imaging region containing an inspection object, and an LED driver 152 for controlling the LED 151. Light emitting timing, light emitting time period, and light emitting amount of the LED 151 can be freely set by means of the LED driver 152. The LED 151 may be provided integrally with the imaging unit 3 or may be provided separately from the imaging unit 3 as an external illumination unit. Although not shown in the drawing, the illumination module 15 is provided with a reflector for reflecting light emitted from the LED 151, a lens that allows passing through of light emitted from the LED 151, and other components. The irradiation range of the LED 151 is set so that the light emitted from the LED 151 will illuminate an inspection object and a surrounding region of the inspection object. A light emitter other than the light emitting diode may also be used.

Configuration of Control Unit 2

The control unit 2 includes a main board 13, a connector board 16, a communication board 17, and a power supply board 18. The main board 13 is mounted with an FPGA 131, a DSP 132, and a memory 133. The FPGA 131 and the DSP 132 constitute a controller 13A, or a main controller having an integration of the FPGA 131 and the DSP 132 may be provided.

The controller 13A of the main board 13 controls operation of each of the boards and the modules that are coupled thereto. For example, the controller 13A outputs an illumination control signal for controlling lighting and extinction of the LED 151, to the LED driver 152 of the illumination module 15. In response to the illumination control signal from the controller 13A, the LED driver 152 switches between lighting and extinction of the LED 151 and adjusts the lighting time period as well as adjusts amount of light and other parameters of the LED 151.

The controller 13A also outputs an imaging control signal for controlling the CMOS sensor 143, to the imaging board 142 of the camera module 14. In response to the imaging control signal from the controller 13A, the CMOS sensor 143 starts imaging and performs imaging by adjusting the exposure time to a desired time period. That is, in response to the imaging control signal output from the controller 13A, the imaging unit 3 performs imaging in the range of the visual field of the CMOS sensor 143. In a state in which an inspection object exists in the range of the visual field, the inspection object is imaged. In a state in which an object other than an inspection object exists in the range of the visual field, this object is also imaged. For example, in setting the image inspection apparatus 1, a non-defective product image that is added with an attribute as a non-defective product by a user and a defective product image that is added with an attribute as a defective product by a user are captured. In operating the image inspection apparatus 1, an inspection object is imaged. The CMOS sensor 143 is configured to output a live image, that is, a currently captured image, at a short frame rate at any time.

After the CMOS sensor 143 finishes the imaging, an image signal is output from the imaging unit 3 to the FPGA 131 of the main board 13, processed by the FPGA 131 and the DSP 132, and then stored in the memory 133. Details of a specific content of processing performed by the controller 13A of the main board 13 will be described later.

The connector board 16 is supplied with electric power from outside via a power supply connector (not shown) that is provided to a power supply interface 161. The power supply board 18 distributes electric power, which is received by the connector board 16, to each of the boards and the modules. Specifically, the power supply board 18 distributes electric power to the illumination module 15, the camera module 14, the main board 13, and the communication board 17. The power supply board 18 includes an AF motor driver 181. The AF motor driver 181 supplies driving power to the AF motor 141 of the camera module 14 to achieve autofocus. The AF motor driver 181 adjusts electric power to be supplied to the AF motor 141, in accordance with an AF control signal from the controller 13A of the main board 13.

The communication board 17 receives a pass/fail determination signal of an inspection object, image data, a user interface, and other information output from the controller 13A of the main board 13 and outputs these information to the display device 4, the personal computer 5, an external control device (not shown), or other device. The display device 4 and the personal computer 5 each have a display panel composed of, for example, a liquid crystal panel, and image data, a user interface, and other information appear on the display panel.

The communication board 17 also receives various kinds of operations input from a touch panel 41 of the display device 4, a keyboard 51 of the personal computer 5, or other unit, by a user. The touch panel 41 of the display device 4 is, for example, a conventionally known touch operation panel mounted with a pressure sensitive sensor. The touch panel 41 detects touch operation by a user and outputs the content of the touch operation to the communication board 17. The personal computer 5 includes, in addition to the keyboard 51, a mouse or a touch panel, which is not shown in the drawing. The personal computer 5 receives various kinds of operations input from these operation devices by a user. Communication may be performed by wired communication or wireless communication. Each of these communication manners can be implemented by a conventionally known communication module.

The control unit 2 is provided with a storage 19, such as a hard disk drive. The storage 19 stores a program file 80, a setting file, and other information, or software, for enabling the pieces of hardware to execute each control and each processing, which are described later. The program file 80 and the setting file are stored in a storage medium 90, such as an optical disc, and the program file 80 and the setting file stored in the storage medium 90 may be installed in the control unit 2. The storage 19 may also store the image data, result of the pass/fail determination, and other information.

Specific Configuration of Image Inspection Apparatus 1

Figure 3:
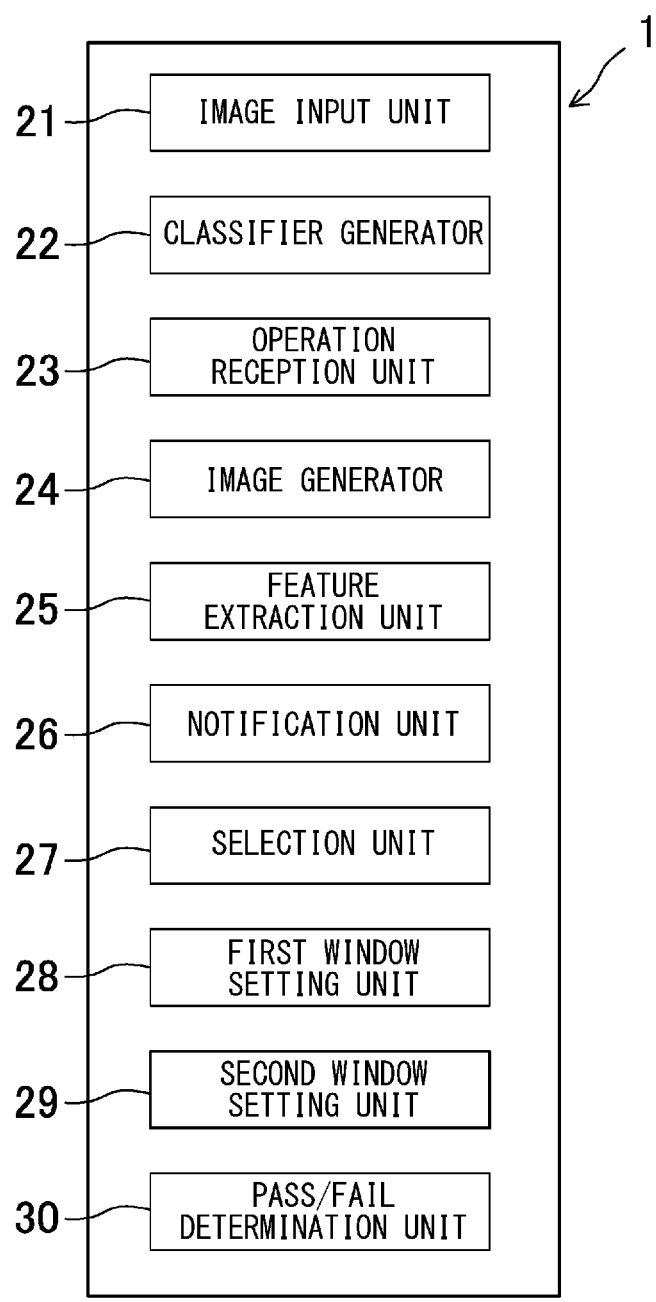
FIG. 3 is a block diagram of the image inspection apparatus.

FIG. 3 is a block diagram of the image inspection apparatus 1 and shows units that are implemented by the control unit 2 in which the program file 80 and the setting file are installed. Specifically, the image inspection apparatus 1 includes an image input unit 21, a classifier generator 22, an operation reception unit 23, an image generator 24, a feature extraction unit 25, a notification unit 26, a selection unit 27, a first window setting unit 28, a second window setting unit 29, and a pass/fail determination unit 30. Each of these units may be constructed of only hardware or may be constructed of a combination of hardware and software. In addition, each of the units shown in FIG. 3 may be independent from each other, or multiple functions may be implemented by one piece of hardware or software. Alternatively, the function of each of the units shown in FIG. 3 may be implemented by control of the controller 13A of the main board 13.

The image inspection apparatus 1 is switched between a setting mode and an operation mode (Run mode). In the setting mode, setting of various kinds of parameters such as imaging settings, registration of a master image, generation of a classifier for enabling distinguishing between a non-defective product image and a defective product image in the image inspection apparatus 1, and other processing are performed. In the operation mode, pass/fail determination with respect to an inspection object on the basis of a captured image of the inspection object in an actual site, is performed. In the setting mode, a preparatory work is performed to enable a user to separate a non-defective product from a defective product in a desired product inspection. Switching between the setting mode and the operation mode may be performed on a user interface, which is not shown in the drawing. Alternatively or additionally, the mode may be automatically shifted to the operation mode at the same time as completion of the setting mode. In the operation mode, a classification boundary may be corrected or changed by the classifier.

Control in Setting Mode of Image Inspection Apparatus 1

Figure 4:
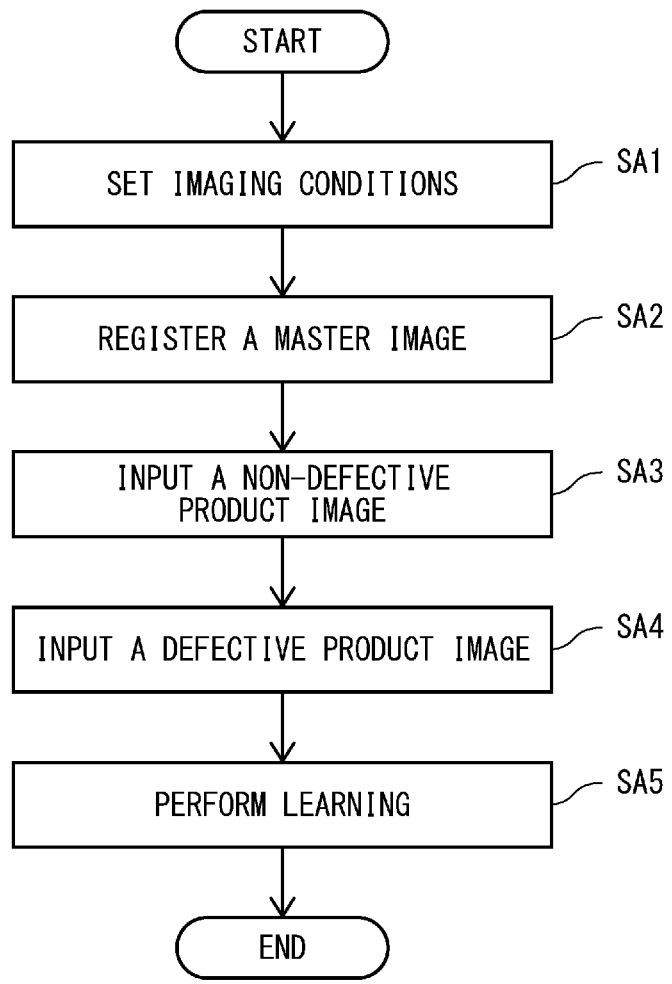
FIG. 4 is a flowchart in a setting mode of the image inspection apparatus.
Figure 5:
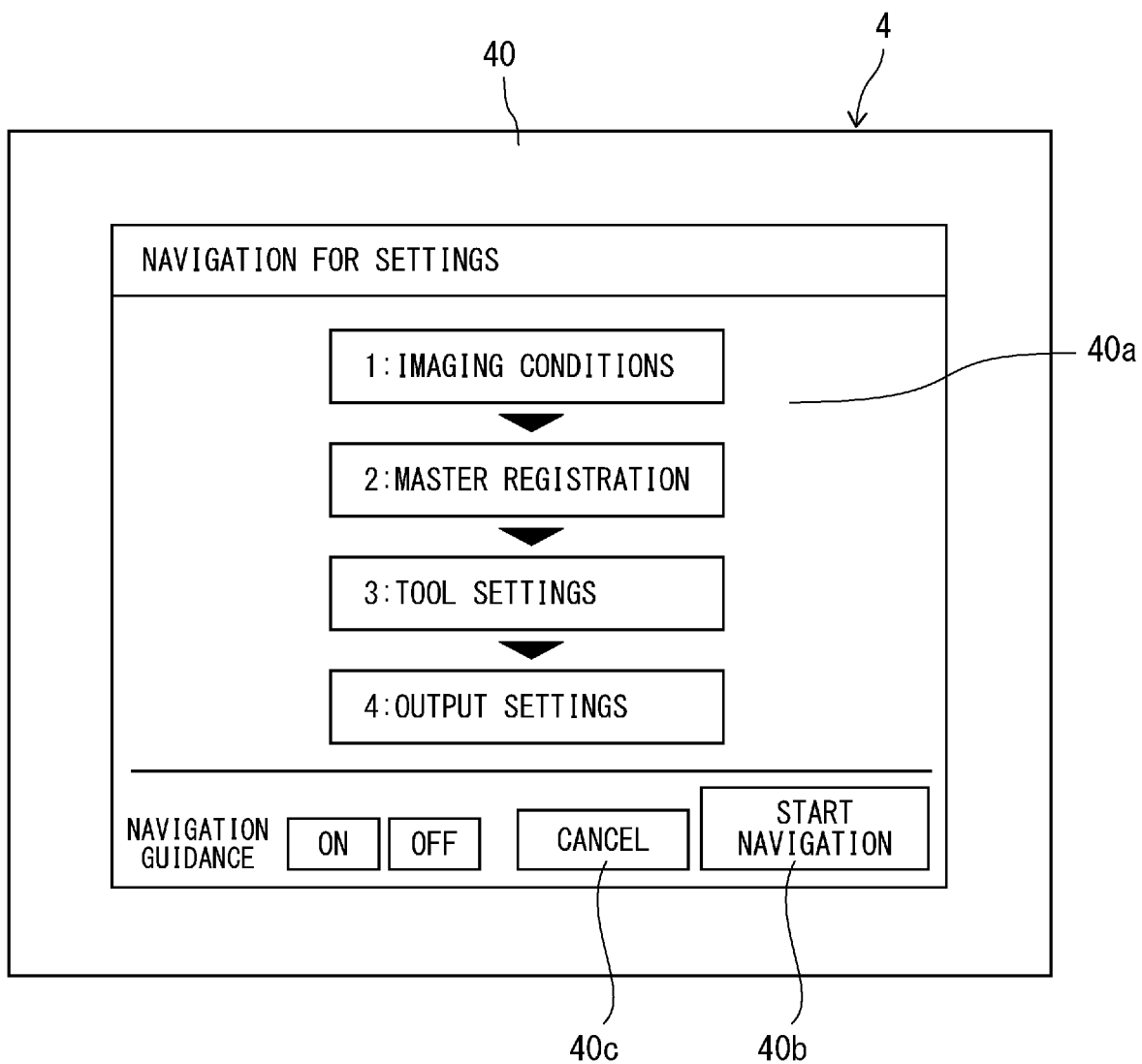
FIG. 5 shows an initial screen in the setting mode.

FIG. 4 is a flowchart in the setting mode of the image inspection apparatus 1. At the time of start, a setting mode user interface 40, as shown in FIG. 5, is generated by the controller 13A of the main board 13 and is displayed on the display device 4. The setting mode user interface 40 is provided with a working procedure display region 40a, a setting start button 40b, and a cancel button 40c. The working procedure display region 40a shows a work flow in the setting mode. In response to pressing the setting start button 40b, instructions for making a user sequentially perform setting works, as shown in the flowchart in FIG. 4, start. On the other hand, in response to pressing the cancel button 40c, the setting mode is intermitted. The operation of "pressing the button" is executed by using the touch panel 41 of the display device 4 or using the keyboard 51, the mouse, or other unit of the personal computer 5. The same applies to operation using a button, hereinafter.

Figure 6:
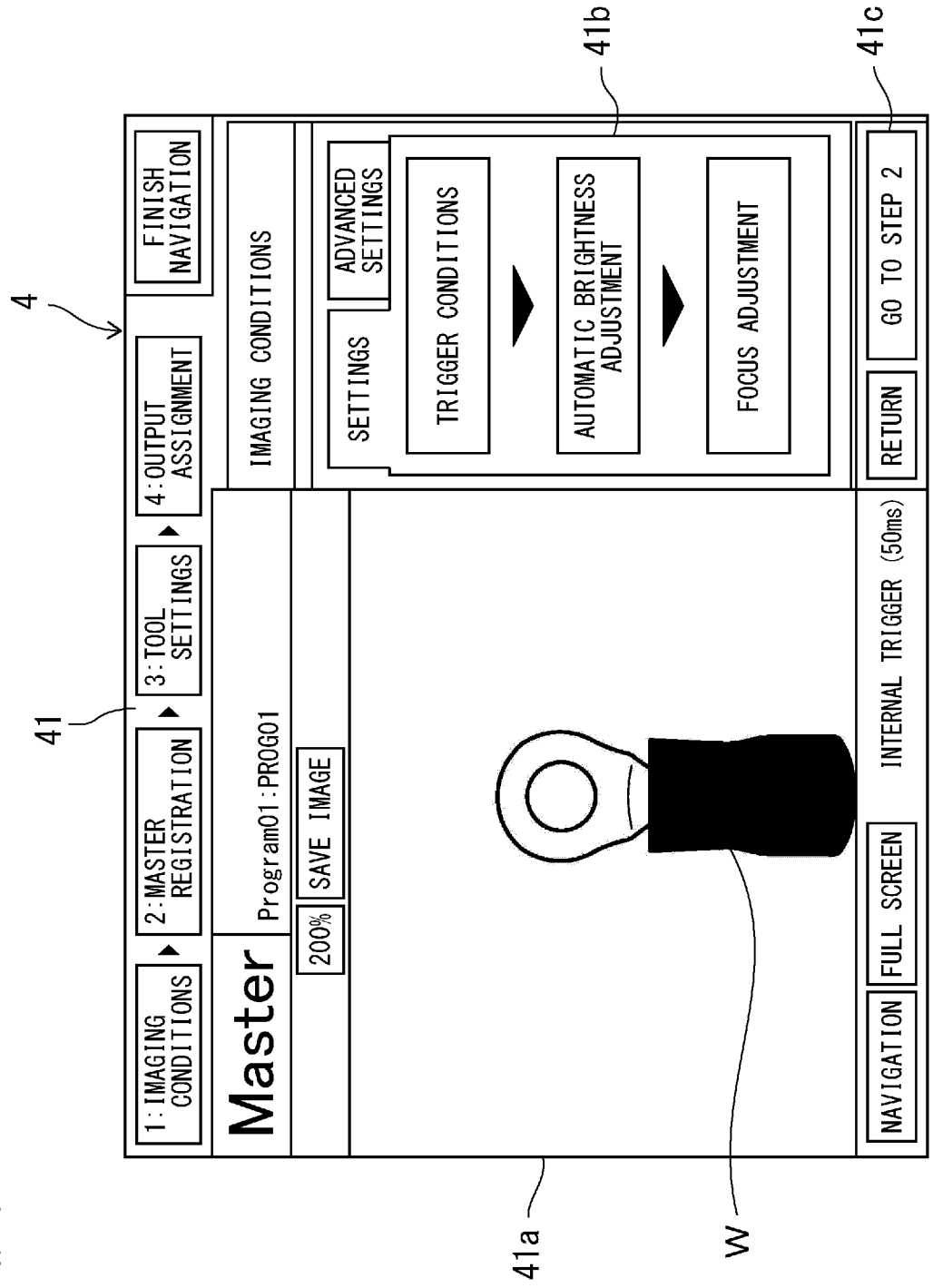
FIG. 6 shows a user interface displayed in setting imaging conditions.

Step SA1 in the flowchart shown in FIG. 4 is an imaging condition setting step. In the imaging condition setting step, an imaging condition setting user interface 41, as shown in FIG. 6, is generated by the controller 13A of the main board 13 and is displayed on the display device 4. The imaging condition setting user interface 41 is provided with an image display region 41a and a setting procedure display region 41b. The image display region 41a displays an image imaged by the CMOS sensor 143. The setting procedure display region 41b shows a setting work procedure of the imaging conditions. The setting procedure display region 41b displays a procedure: trigger condition setting for starting imaging, automatic brightness adjustment for an image imaged by the CMOS sensor 143, and focus adjustment, in this order, and settings are performed in this order. The trigger condition setting includes adjustment of imaging timing. The imaging may be started in response to a trigger signal input from the outside or in response to a trigger signal generated in the image inspection apparatus 1. The automatic brightness adjustment represents automatic adjustment of brightness of an image so that the accuracy of inspection will be high. The brightness of an image may be adjusted by adjusting amount of light of the LED 151 or the exposure time of the CMOS sensor 143. The brightness can be adjusted by a conventionally known method. The brightness may be manually adjusted by a user.

The focus adjustment is implemented so that the focus will be on an inspection object W, by using an autofocus function. However, the method of the focus adjustment is not limited thereto, and the focus may be manually adjusted by a user. After settings of the imaging conditions are finished, a button 41c is pressed in order to advance to a next step. In response to this, the procedure advances to a master image registration step in step SA2 in the flowchart shown in FIG. 4.

A master image is a reference image for setting a frame for inspecting an image, that is, an inspection window, and the master image contains an inspection object W of a non-defective product. This master image is registered in the master image registration step. In the master image registration step, a master image registration user interface 42, as shown in FIG. 7, is generated by the controller 13A of the main board 13 and is displayed on the display device 4.

The master image registration user interface 42 is provided with a candidate image display region 42a that displays an image candidate for a master image. FIG. 7 shows a state in which no master image is registered and no image is displayed in the candidate image display region 42a. The master image registration user interface 42 is also provided with a live image registration button 42b, an history image registration button 42c, and a file image registration button 42d. The live image registration button 42b is operated to register a live image that is imaged by the CMOS sensor 143, as a master image. The history image registration button 42c is operated to register an image left in an image history, as a master image. The file image registration button 42d is operated to register an image already stored, as a master image.

Figure 8:
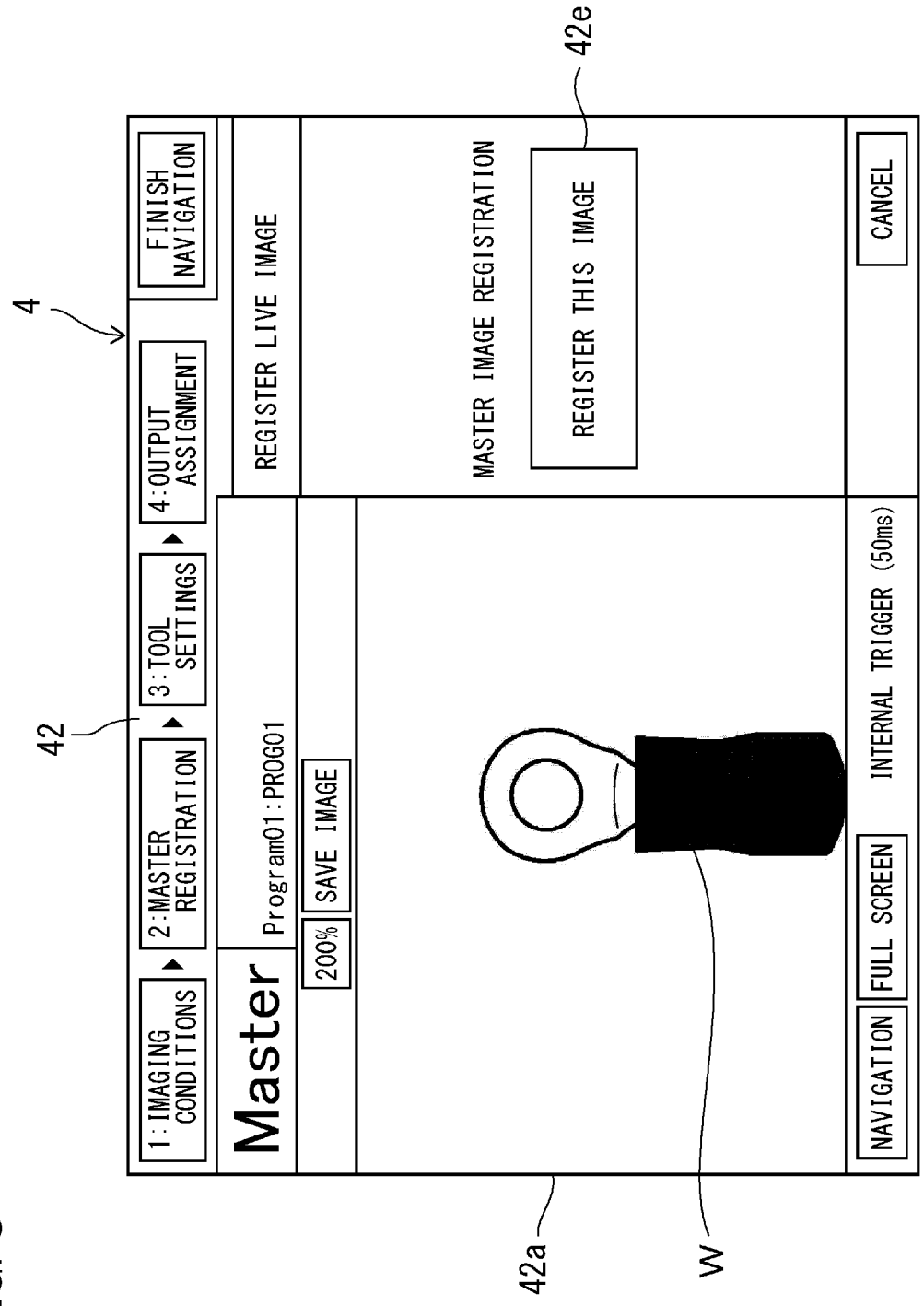
FIG. 8 shows a screen displayed in selecting a master image.

In response to pressing the live image registration button 42b, as shown in FIG. 8, an image currently imaged by the CMOS sensor 143 is displayed in the candidate image display region 42a, and an image registration button 42e appears beside the candidate image display region 42a. While looking at the image displayed in the candidate image display region 42a, a user may press the image registration button 42e when an image to be registered as a master image is displayed. As a result, the image, which is displayed in the candidate image display region 42a when the image registration button 42e is pressed, is registered as a master image. The master image may be stored in the storage 19 shown in FIG. 2. Multiple images may be stored in this manner.

Figure 7:
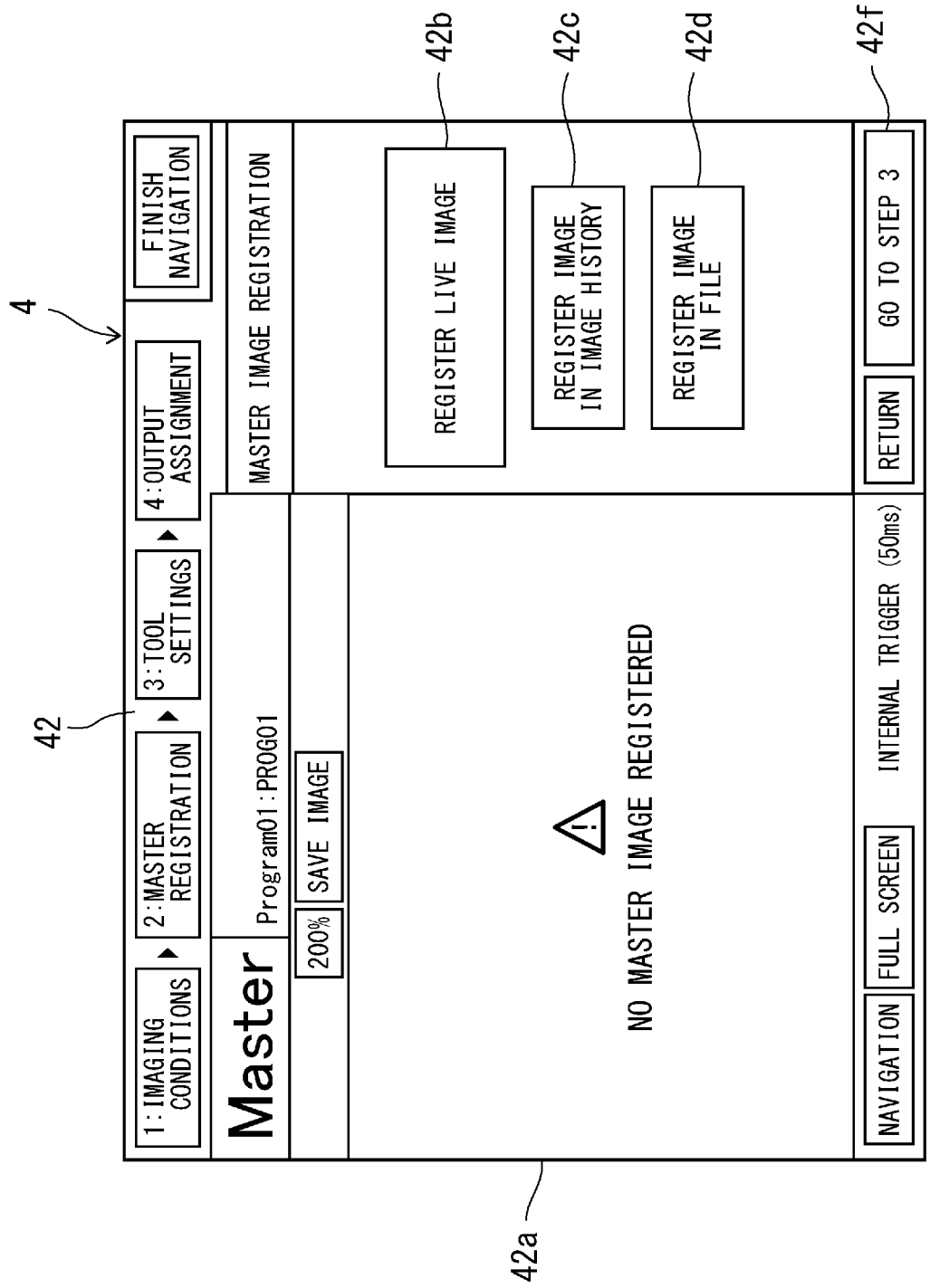
FIG. 7 shows a master image registration user interface.

In response to pressing the history image registration button 42c as shown in FIG. 7, images imaged in the past are displayed in the candidate image display region 42a. Among these images, a desired image may be selected and be registered as a master image. The images imaged in the past may be automatically stored in the storage 19 or may be stored by storage operation performed by a user. In response to pressing the file image registration button 42d as shown in FIG. 7, images stored in the storage 19 are read. Among these images, a desired image may be selected and be registered as a master image. After the master image is registered, a button 42f, as shown in FIG. 7, is pressed in order to advance to a next step.

Figure 9:
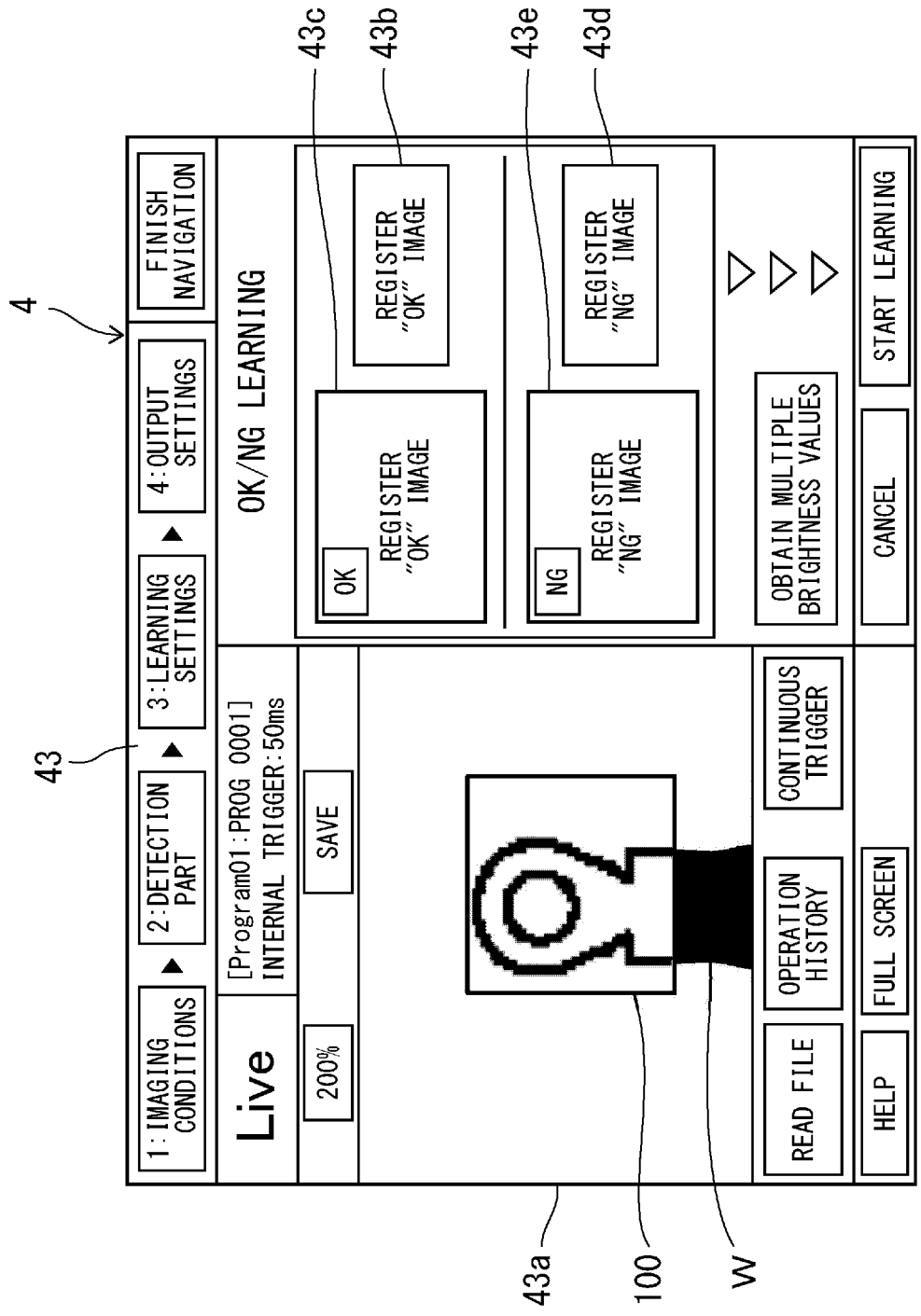
FIG. 9 shows a learning setting user interface.

Then, a learning setting user interface 43, as shown in FIG. 9, is generated by the controller 13A of the main board 13 and is displayed on the display device 4. The learning setting user interface 43 is provided with an input image display region 43a. In a first step, a master image is displayed in the input image display region 43a. A user may set an inspection window 100 while looking at the master image displayed in the input image display region 43a. The inspection window 100 may be set to surround the whole inspection object W in the master image or may be set to surround a characteristic part of the inspection object W. The inspection window 100 may be rectangular shaped, for example. In a case of drawing a rectangular area as the inspection window 100, touch operation is performed by dragging from an upper corner of the rectangular area to a diagonal lower corner, whereby an inspection window 100 appears in the input image display region 43a. The inspection window 100 is superimposed on the master image. The position, the dimensions, and the shape of the inspection window 100 may be corrected. As described later, the inspection window 100 may be automatically set.

As shown in FIG. 9, an edge of an inspection object W may be extracted by an edge extraction function of the image inspection apparatus 1 and may be superimposed.

After the inspection window 100 is set, the procedure advances to a non-defective product image input step in step SA3 in the flowchart shown in FIG. 4. A non-defective product image is an image added with an attribute as a non-defective product by a user and may also be called an image containing an inspection object W of a non-defective product. The non-defective product image is input separately from the master image. As shown in FIG. 9, the learning setting user interface 43 is provided with a non-defective product image input button 43b, a non-defective product image display region 43c, a defective product image input button 43d, and a defective product image display region 43e.

Figure 10:
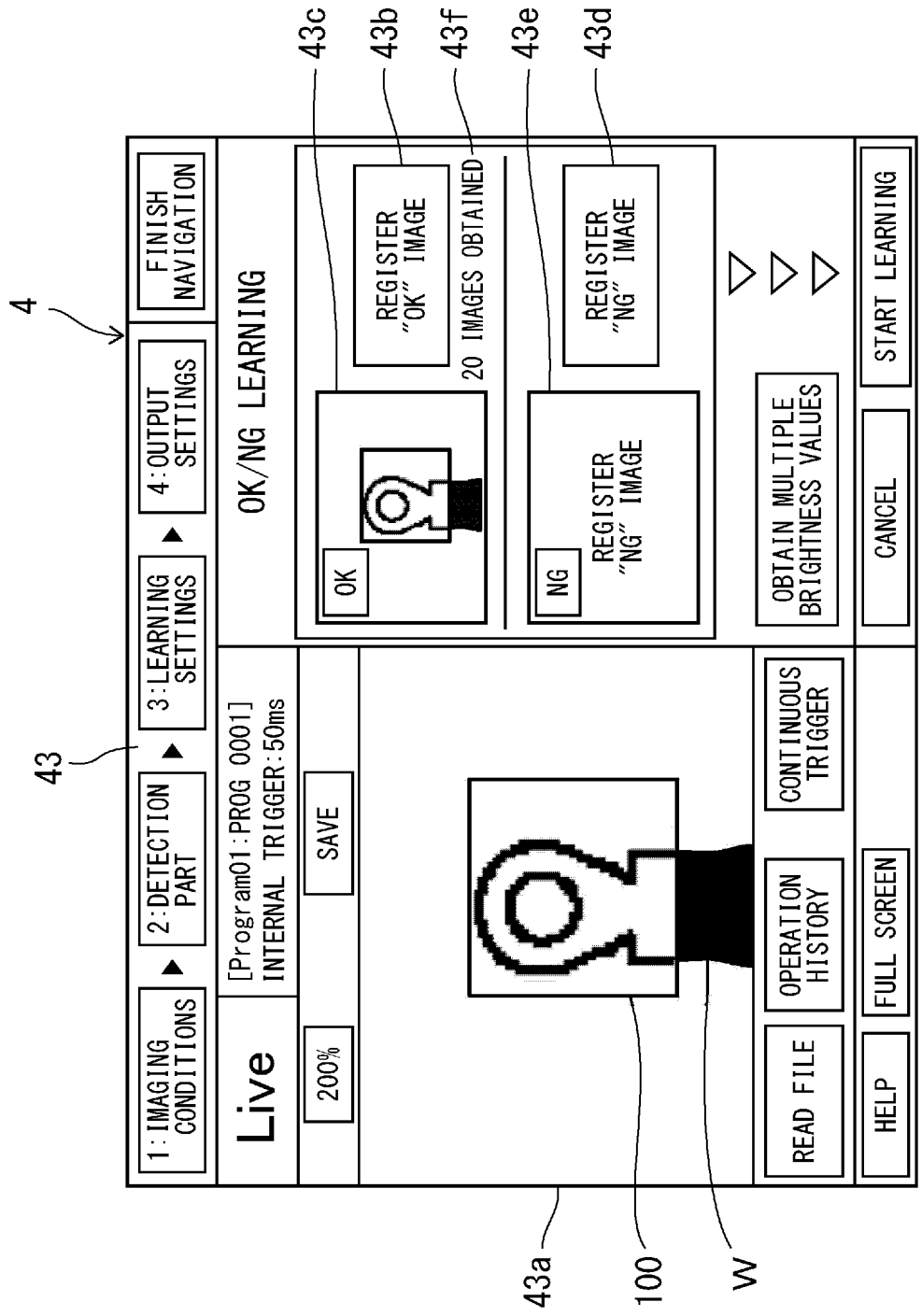
FIG. 10 shows a screen displayed in a non-defective product image input step.

As shown in FIG. 10, when a user has placed an inspection object W of a non-defective product in the range of the visual field of the CMOS sensor 143, the controller 13A displays a live image, which is imaged by the CMOS sensor 143, in the input image display region 43a of the learning setting user interface 43. In response to pressing the non-defective product image input button 43b in the state in which the inspection object W of a non-defective product appears in the input image display region 43a, the image that appears in the input image display region 43a at that time, that is, the non-defective product image, is displayed in the non-defective product image display region 43c as a still image and is stored in one or both of the memory 133 and the storage 19. This non-defective product image is added with an attribute as a non-defective product by the user. This process is the non-defective product image input step and is performed by the image input unit 21 shown in FIG. 3. In the non-defective product image input step, at least one non-defective product image is input, and multiple non-defective product images may be input. In the case of inputting multiple non-defective product images, images containing different non-defective products may be input, or images that are obtained by imaging multiple times while changing an angle and a position of one non-defective product, may be input. The number of the input non-defective product images is displayed in an input image number display region 43f of the learning setting user interface 43. Multiple non-defective product images compose a non-defective product image group.

The image input unit 21 may include the camera module 14, the display device 4, the touch panel 41, the controller 13A for making the learning setting user interface 43 be displayed, and other components, as units for implementing the non-defective product image input step.

After the non-defective product image is input, the procedure advances to a defective product image input step in step SA4 in the flowchart shown in FIG. 4. A defective product image is an image added with an attribute as a defective product by a user and may also be called an image containing an inspection object W of a defective product. In some cases, a user may mistakenly recognize a non-defective product as a defective product. Also in this situation, the image that is added with an attribute as a defective product by a user is used as a defective product image in this embodiment. That is, the defective product image can include an image containing a product that is actually defective and an image containing a non-defective product.

Figure 11:
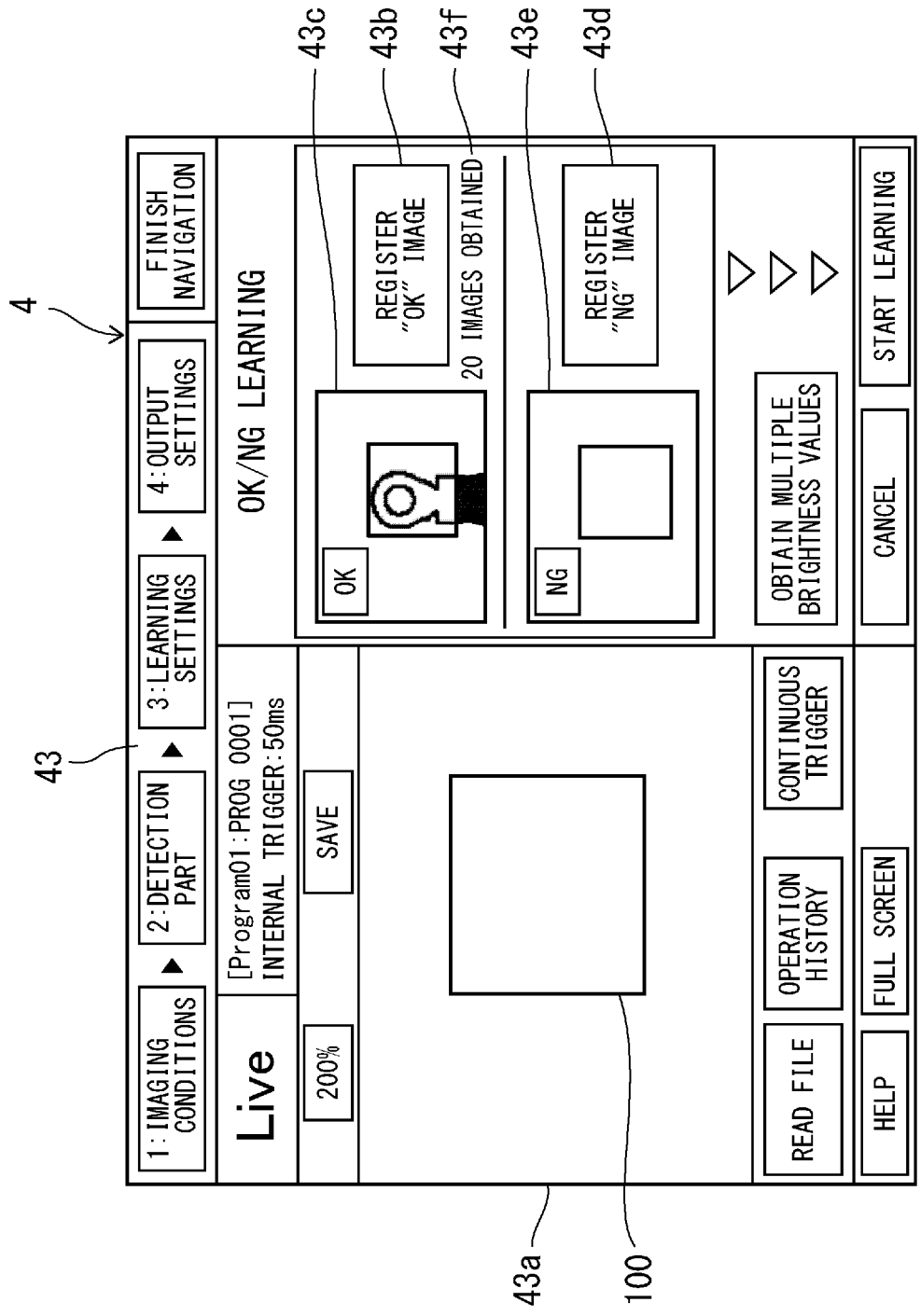
FIG. 11 shows a screen displayed in a defective product image input step.

As shown in FIG. 11, when a user has placed an inspection object W that a user recognizes as a defective product, in the range of the visual field of the CMOS sensor 143, the controller 13A makes a live image, which is imaged by the CMOS sensor 143, appear in the input image display region 43a of the learning setting user interface 43. At this time, a non-defective product image is displayed in the non-defective product image display region 43c at all time.

In response to pressing the defective product image input button 43d in the state in which the inspection object W that a user recognizes as a defective product appears in the input image display region 43a, the image that appears in the input image display region 43a at that time, that is, the defective product image, is displayed in the defective product image display region 43e as a still image and is stored in one or both of the memory 133 and the storage 19. This defective product image is added with an attribute as a defective product by the user. This process is the defective product image input step and is performed by the image input unit 21 shown in FIG. 3. In the defective product image input step, at least one defective product image is input, and multiple defective product images may be input. In the case of inputting multiple defective product images, images containing different defective products may be input, or images that are obtained by imaging multiple times while changing an angle and a position of one defective product may be input. The number of the input defective product images is displayed in the learning setting user interface 43. Multiple defective product images compose a defective product image group.

That is, the image input unit 21 inputs a non-defective product image group and a defective product image group as well as a non-defective product image added with an attribute as a non-defective product by a user and a defective product image added with an attribute as a defective product by a user. The input of the non-defective product image and the defective product image can also be called registration to the image inspection apparatus 1.

After the defective product image is input, the procedure advances to a learning step in step SA5 in the flowchart shown in FIG. 4. The learning step is performed by the classifier generator 22 shown in FIG. 3. The classifier generator 22 inputs the non-defective product image and the defective product image, which are input by the image input unit 21, to a learning processor with a multi-layered structure to generate a classifier for distinguishing between a non-defective product image and a defective product image. A non-defective product image group composed of multiple non-defective product images and a defective product image group composed of multiple defective product images may be input to the learning processor to generate a classifier in a manner similar to that described above. As the image to be input to the learning processor, an image within an inspection window 100 may be used.

Specifically, the classifier generator 22 has a neural network, and a method of a generally called deep learning may be adapted. In this case, an initial value of a parameter of the neural network is randomly determined, and an error of image recognition output from the neural network is fed back to adjust the parameter. The neural network in which the parameter is adjusted, that is, a learned neural network, may be provided to a user, or a user may adjust the parameter. The step of generating a classifier for distinguishing between a non-defective product image and a defective product image is performed in the setting mode of the image inspection apparatus 1.

Features that contribute to distinguishing between a non-defective product image and a defective product image by the classifier include, for example, brightness, angle, and color. However, other features may contribute to distinguishing between a non-defective product image and a defective product image. Thus, the types of the features are not specifically limited.

Figure 12:
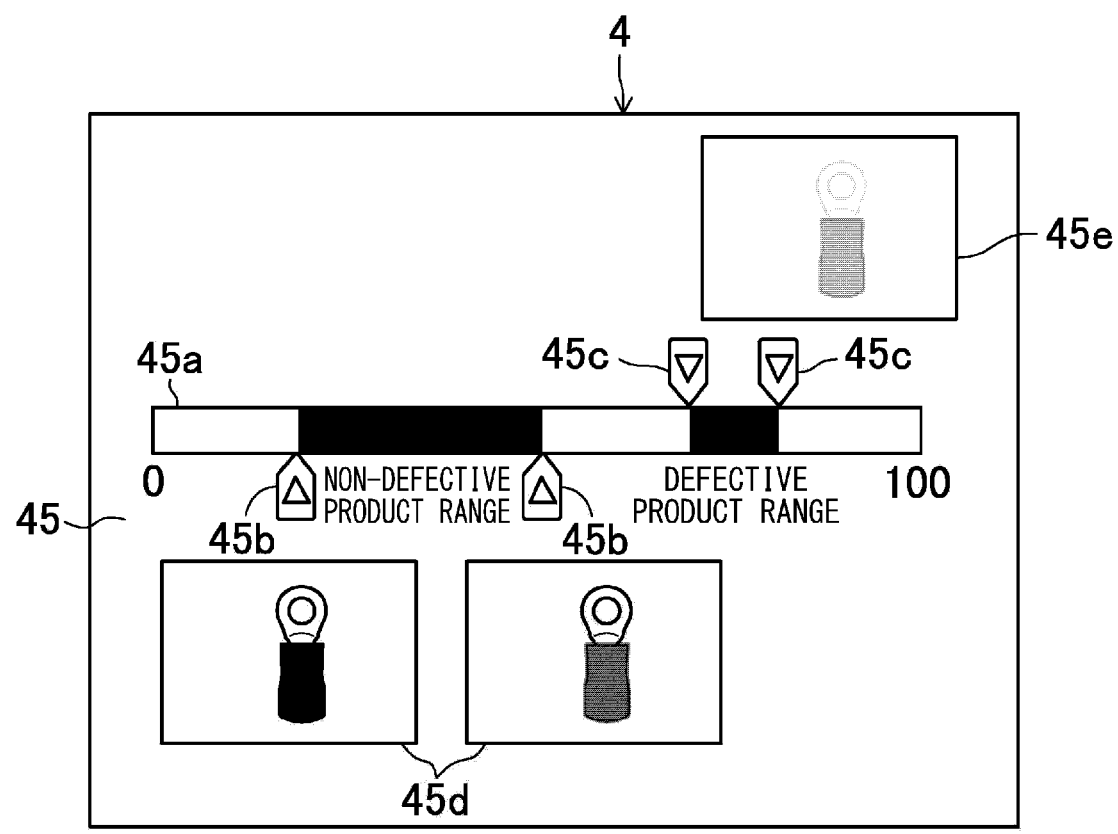
FIG. 12 shows a range adjustment user interface.

As shown in FIG. 3, the image inspection apparatus 1 has an operation reception unit 23. The operation reception unit 23 receives operation for extending a non-defective product range of a feature, which contributes to distinguishing between a non-defective product image and a defective product image by the classifier generated by the classifier generator 22. The operation reception unit 23 generates a range adjustment user interface 45, as shown in FIG. 12, and the operation reception unit 23 makes the generated range adjustment user interface 45 appear in the display device 4. In the range adjustment user interface 45 shown in FIG. 12, brightness of an image is used as a feature that contributes for distinguishing between a non-defective product image and a defective product image. In this case, the darkest level is represented as "0", whereas the brightest level is represented as "100", but these values are freely set. In the range of brightness between 0 to 100, a non-defective product range and a defective product range are respectively adjusted. More specifically, the range adjustment user interface 45 has a laterally long bar display 45a, two non-defective product range setting markers 45b and 45b, and two defective product range setting markers 45c and 45c. The image is darker as the marker approaches a left end and is lighter as the marker approaches a right end in the bar display 45a. The two non-defective product range setting markers 45b and 45b are respectively movable in the longitudinal direction of the bar display 45a by, for example, operation of the touch panel 41 of the display device 4. The range of brightness between the two non-defective product range setting markers 45b and 45b is set as the non-defective product range. The non-defective product range is narrowed as the distance between the two non-defective product range setting markers 45b and 45b is decreased. Conversely, the non-defective product range is extended as the distance between the two non-defective product range setting markers 45b and 45b is increased. Thus, the range adjustment user interface 45 receives operation for extending the non-defective product range of a feature and operation for narrowing the non-defective product range of a feature. Similarly, operation for extending the defective product range of a feature and operation for narrowing the defective product range of a feature are received in response to operation of the two defective product range setting markers 45c and 45c. The non-defective product range and the defective product range of a feature may also be set by directly inputting values of brightness, instead of using the bar display 45a.

The range adjustment user interface 45 shown in FIG. 12 is configured to display a non-defective product range of a feature, which contributes to distinguishing between a non-defective product image and a defective product image by the classifier. Thus, the non-defective product range of a feature, which contributes to distinguishing between a non-defective product image and a defective product image by the classifier, is able to be displayed on the display device 4. This enables a user to easily check the non-defective product range of a feature. The showing of the non-defective product range of a feature on the display device 4 may be disabled. Similarly, as for the defective product range of a feature, which contributes to distinguishing between a non-defective product image and a defective product image by the classifier, the showing of the defective product range on the display device 4 may be enabled or may be disabled.

As shown in FIG. 3, the image inspection apparatus 1 has an image generator 24. The image generator 24 generates a new image that is determined as a non-defective product image, that is, an automatically generated non-defective product image, in accordance with the result of operation received by the operation reception unit 23. When the non-defective product range of a feature, which contributes to distinguishing between a non-defective product image and a defective product image by the classifier, is extended by means of the operation reception unit 23, the image generator 24 reads the extended non-defective product range, or more specifically, the range of brightness, and the image generator 24 automatically generates an image with a brightness within the non-defective product range. The image generator 24 generates, for example, a darkest image within the non-defective product range and a brightest image within the non-defective product range, and also generates an image with a middle brightness within the non-defective product range. The number of the generated images is not specifically limited, and the number of the generated images may be one or more than one.

The image generator 24 obtains an automatically generated non-defective product image by changing brightness of the non-defective product image that is preliminarily input by the image input unit 21, by image processing. In this case, the image generator 24 generates an automatically generated non-defective product image in the internal processing.

The image generator 24 may obtain automatically generated non-defective product images by making the CMOS sensor 143 image an inspection object W of a non-defective product in the range of the visual field of the CMOS sensor 143, multiple times, while an exposure time is changed. The automatically generated non-defective product images may also be obtained by making the CMOS sensor 143 image multiple times while brightness of illumination from the illumination module 15 is changed, instead of an exposure time. The automatically generated non-defective product images may also be obtained by making the CMOS sensor 143 image multiple times while both the exposure time of the CMOS sensor 143 and the brightness of illumination from the illumination module 15 are changed. In this case, the image generator 24 controls the CMOS sensor 143 and, as necessary, controls the illumination module 15, thereby obtaining an automatically generated non-defective product image.

The automatically generated non-defective product image, which is generated by the image generator 24, may be displayed in the range adjustment user interface 45, as shown in FIG. 12. The range adjustment user interface 45 is provided with automatically generated non-defective product image display regions 45d and 45d that display automatically generated non-defective product images. The automatically generated non-defective product image display region 45d on the left displays a darkest image within the non-defective product range, whereas the automatically generated non-defective product image display region 45d on the right displays a brightest image within the non-defective product range. The number of the automatically generated non-defective product image display regions 45d is not limited to two and may be one, or three or more. This number may be the same as the number of the automatically generated non-defective product images generated by the image generator 24. Preferably, a darker image, which is generated by the image generator 24, is displayed on a darker side of the bar display 45a, and a brighter image, which is generated by the image generator 24, is displayed on a brighter side of the bar display 45a. Thus, the automatically generated non-defective product image, which is generated by the image generator 24, is able to be displayed on the display device 4. This enables a user to easily check the automatically generated non-defective product image.

When the defective product range of a feature, which contributes to distinguishing between a non-defective product image and a defective product image by the classifier, is extended by means of the operation reception unit 23, the image generator 24 may read the extended defective product range, or more specifically, the range of brightness, and the image generator 24 may generate a new image that is determined as a defective product image, that is, an automatically generated defective product image. The automatically generated defective product image, which is generated by the image generator 24, may be displayed in the range adjustment user interface 45, as shown in FIG. 12. The range adjustment user interface 45 is provided with an automatically generated defective product image display region 45e that displays an automatically generated defective product image.

The image generator 24 may also generate an image in the vicinity of the boundary of the non-defective product range or the boundary of the defective product range. In one example, an image with a brightness close to the value at the boundary of the non-defective product range may be generated and be displayed in the range adjustment user interface 45, as shown in FIG. 12. In another example, an image with a brightness close to the value at the boundary of the defective product range may be generated and be displayed in the range adjustment user interface 45, as shown in FIG. 12. As a result, an image in the vicinity of the boundary of the non-defective product range or the boundary of the defective product range is displayed on the display device 4, whereby a user easily visually understands the non-defective product range or the defective product range.

The image that is generated by the image generator 24 is input to the classifier generator 22 shown in FIG. 3. The classifier generator 22 inputs the image that is generated by the image generator 24, to the learning processor to update the classifier. Specifically, when a user extends the non-defective product range of a feature, which contributes to distinguishing between a non-defective product image and a defective product image by the classifier, this operation is received by the operation reception unit 23. Then, the image generator 24 automatically generates a new image that is determined as a non-defective product image, and the generated image is input to the classifier generator 22. Thus, the user needs not to prepare a new non-defective product image in order to extend the non-defective product range, and therefore, the burden on the user is reduced. The new non-defective product image, which is generated by the image generator 24, is displayed on the display device 4, thereby enabling the user to visually recognize it. This function makes the result of distinguishing performed by the image inspection apparatus 1 and the sense of distinguishing of a user come close to each other.

As shown in FIG. 3, the image inspection apparatus 1 includes a feature extraction unit 25. In the feature extraction unit 25, multiple types of features that can contribute to distinguishing between a non-defective product image and a defective product image by the classifier, which is generated by the classifier generator 22, are defined in advance. The feature extraction unit 25 automatically extracts a feature with a higher contribution to distinguishing between a non-defective product image and a defective product image by the classifier, from among the multiple types of the predefined features.

The predefined features include at least one of brightness, angle, and color. The "brightness" represents brightness of a non-defective product image and a defective product image. The "angle" represents an inclination angle of an inspection object W relative to an X-axis or a Y-axis. The X-axis may be an axis in the vertical direction of the display device 4, and the Y-axis may be an axis in the lateral direction of the display device 4. In one example, an edge of an inspection object W in a non-defective product image or a defective product image may be extracted by the edge extraction function, and an inclination angle of a specific edge relative to the X-axis or the Y-axis may be used as the "angle". The "color" represents the color of an inspection object W, and the color of an inspection object W is extracted by image processing and is used as a feature.

For example, in a case in which "color" is the same between a non-defective product image and a defective product image, the "color" has a low contribution to distinguishing between a non-defective product image and a defective product image and is thereby ranked as a feature with a lower contribution, among the multiple features. Similarly, in a case in which an "angle" of an inspection object W is equivalent between a non-defective product image and a defective product image, the "angle" has a low contribution to distinguishing between a non-defective product image and a defective product image and is thereby ranked as a feature with a lower contribution. Also, similarly, in a case in which "brightness" is equivalent between a non-defective product image and a defective product image, the "brightness" has a low contribution to distinguishing between a non-defective product image and a defective product image and is thereby ranked as a feature with a lower contribution. Conversely, in a case in which "color" is greatly different between a non-defective product image and a defective product image, the "color" has a high contribution to distinguishing between a non-defective product image and a defective product image and is thereby ranked as a feature with a higher contribution. In a case in which an "angle" is greatly different between a non-defective product image and a defective product image, the "angle" has a high contribution to distinguishing between a non-defective product image and a defective product image and is thereby ranked as a feature with a higher contribution. In a case in which "brightness" is greatly different between a non-defective product image and a defective product image, the "brightness" has a high contribution to distinguishing between a non-defective product image and a defective product image and is thereby ranked as a feature with a higher contribution.

Thus, a feature with a higher contribution to distinguishing between a non-defective product image and a defective product image is extracted. The feature with a higher contribution may include a feature with the highest contribution (first-ranked feature), a feature with the second highest contribution (second-ranked feature), or a feature with the third highest contribution (third-ranked feature). The feature with a higher contribution may not include the first-ranked feature. In addition, multiple features may be ranked as features with higher contributions.

The operation reception unit 23 shown in FIG. 3 may also receive operation for extending the non-defective product range of a feature with a higher contribution, which is extracted by the feature extraction unit 25. The range adjustment user interface 45 shown in FIG. 12 is displayed in the case in which the feature with a higher contribution that is extracted by the feature extraction unit 25, is brightness. However, in the case in which the feature with a higher contribution is angle, a user interface that enables angle adjustment in a manner similar to that described above, is displayed. Also, in the case in which the feature with a higher contribution is color, a user interface that enables color adjustment in a manner similar to that described above, is displayed. The range adjustment user interface 45 may also enable adjustment of multiple features. Thus, extension of the non-defective product range of a feature with a higher contribution is operated, whereas the non-defective product range of a feature with a lower contribution is not operated. As a result, the classifier is reliably updated, whereby the accuracy of distinguishing between a non-defective product image and a defective product image is further increased.

The feature extraction unit 25 may perform multiple types of filter processing on a non-defective product image and a defective product image and may extract a feature with a higher contribution on the basis of the filter processed image. The resultant images, which are obtained by performing the filter processing on a non-defective product image and a defective product image, may also be called intermediate images. The intermediate image, which is obtained through the filter processing, facilitates extraction of features, thereby making it easy to extract a feature with a higher contribution.

Feature Space

The classifier generator 22 may input the non-defective product image group and the defective product image group, which are input by the image input unit 21, to the learning processor with the multi-layered structure. The classifier generator 22 may then plot the non-defective product image group and the defective product image group in a feature space and may set a classification boundary between the non-defective product image group and the defective product image group, which are plotted in the feature space. The classifier generator 22 may thus generate a classifier for distinguishing a non-defective product image and a defective product image.

Figure 13A:
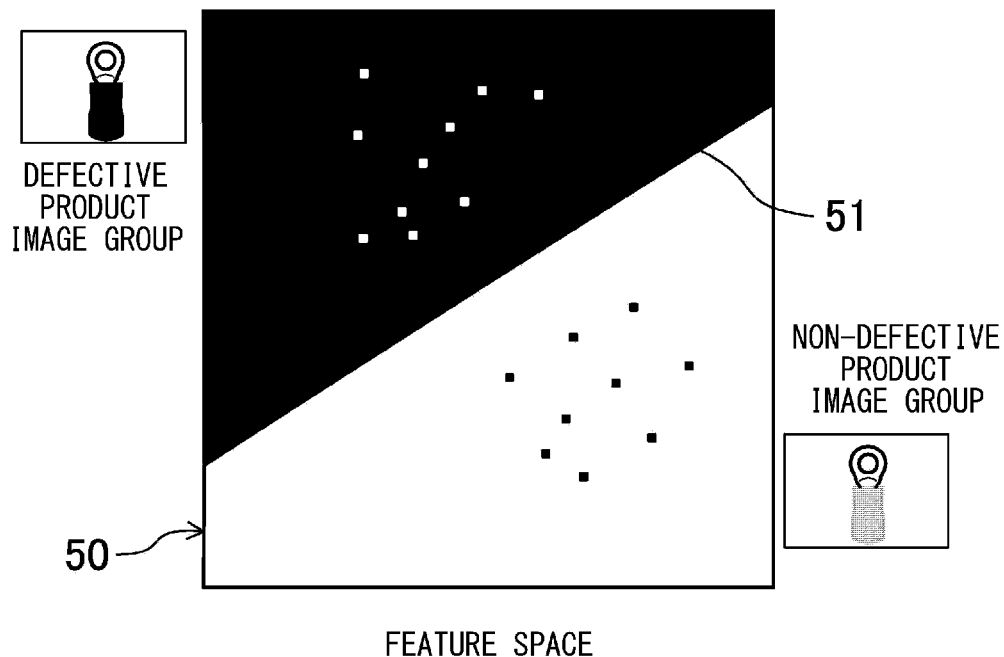
FIG. 13A schematically shows a feature space in which a non-defective product image group and a defective product image group are plotted.

FIG. 13A schematically shows a feature space 50 in which a non-defective product image group and a defective product image group are plotted. The non-defective product image group is plotted by black circles, and the defective product image group is plotted by white circles. A classification boundary 51 is set between the non-defective product image group and the defective product image group. The classification boundary 51 is set to pass through the middle between the non-defective product image group and the defective product image group and may be a linear boundary or a curve boundary. Due to the use of the feature space 50, the classification boundary 51 may also be set in a three-dimensional space.

Control in Operation Mode of Image Inspection Apparatus 1

After various settings are completed in the setting mode, the image inspection apparatus 1 shifts to the operation mode. The setting mode may be shifted to the operation mode in accordance with a shift operation performed by a user or may be automatically shifted to the operation mode after the setting mode is completed.

Figure 14:
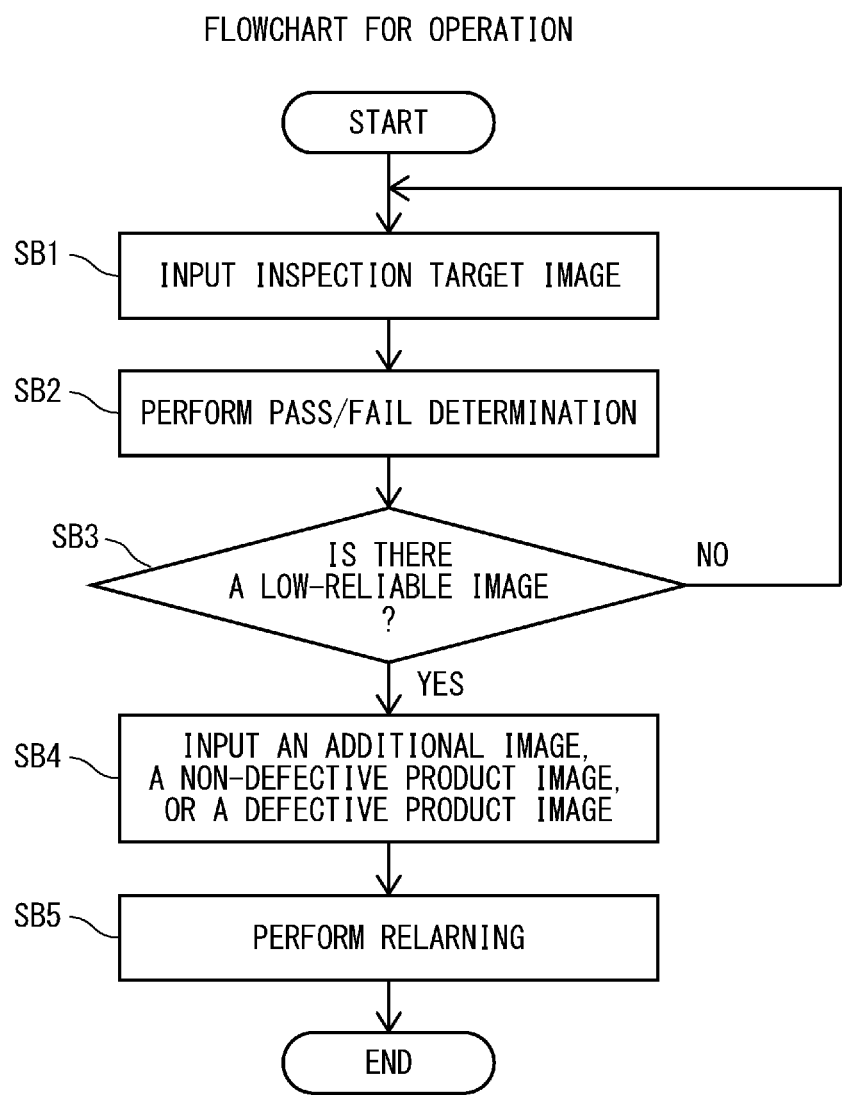
FIG. 14 is a flowchart in an operation mode of the image inspection apparatus.

Step SB1 in the flowchart in the operation mode shown in FIG. 14 is an inspection object image input step. An inspection object image is obtained by imaging an inspection object W during operation of the image inspection apparatus 1 and is input by the image input unit 21. When a trigger signal is input in a state in which an inspection object W is positioned in a range of the visual field of the CMOS sensor 143, the image input unit 21 controls the CMOS sensor 143 to image the inspection object W, and this image is input to the pass/fail determination unit 30 shown in FIG. 3, as an inspection object image.

Step SB2 is a pass/fail determination step and is performed by the pass/fail determination unit 30. The pass/fail determination unit 30 inputs the inspection object image to the classifier, which is generated by the classifier generator 22, to perform pass/fail determination of this inspection object image. Whether the inspection object image is a non-defective product image or a defective product image is determined on the basis of a feature that contributes to distinguishing between a non-defective product image and a defective product image by the classifier.

Figure 15:
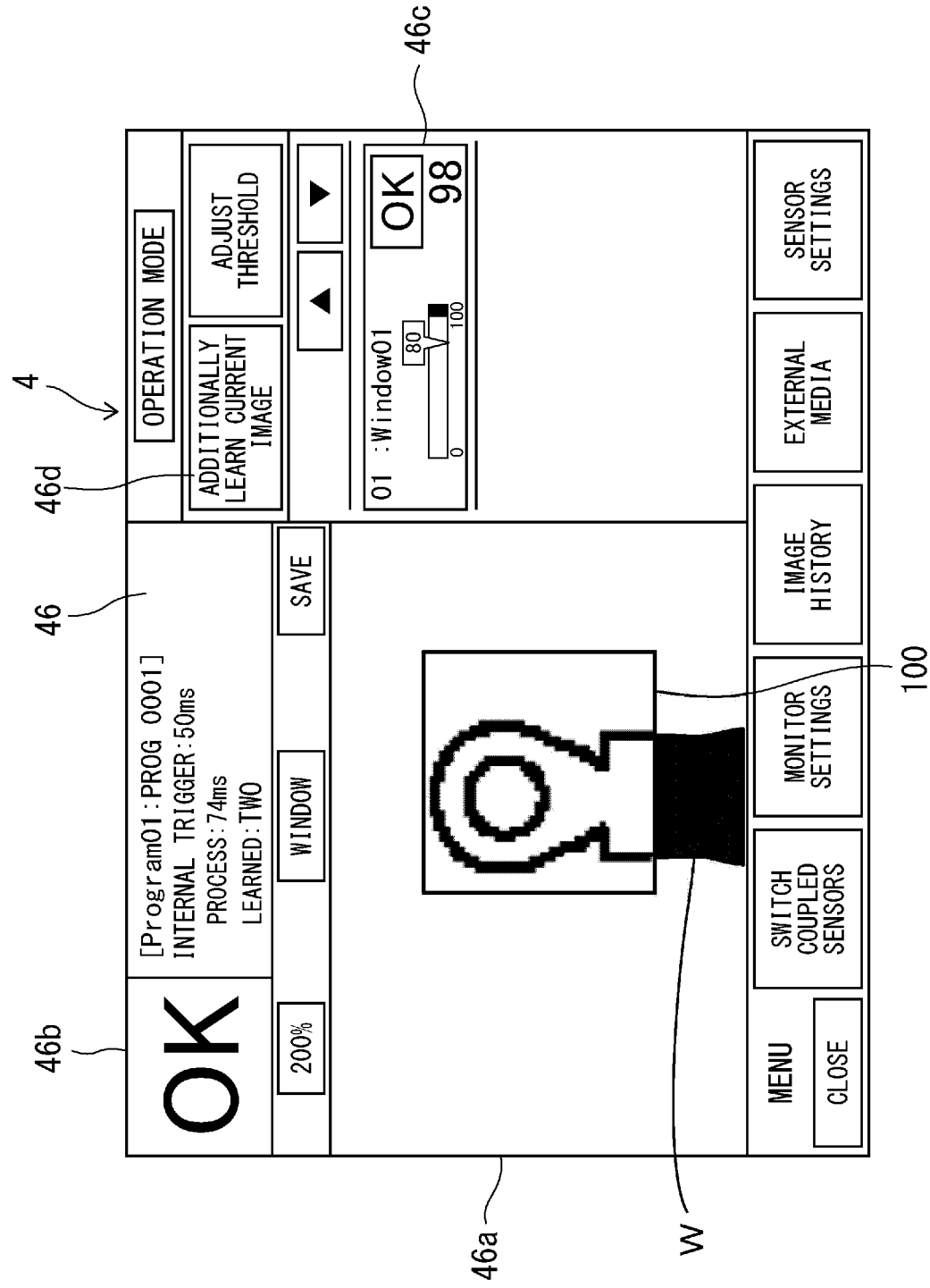
FIG. 15 shows a user interface in a case in which an inspection object image is a non-defective product image.
Figure 16:
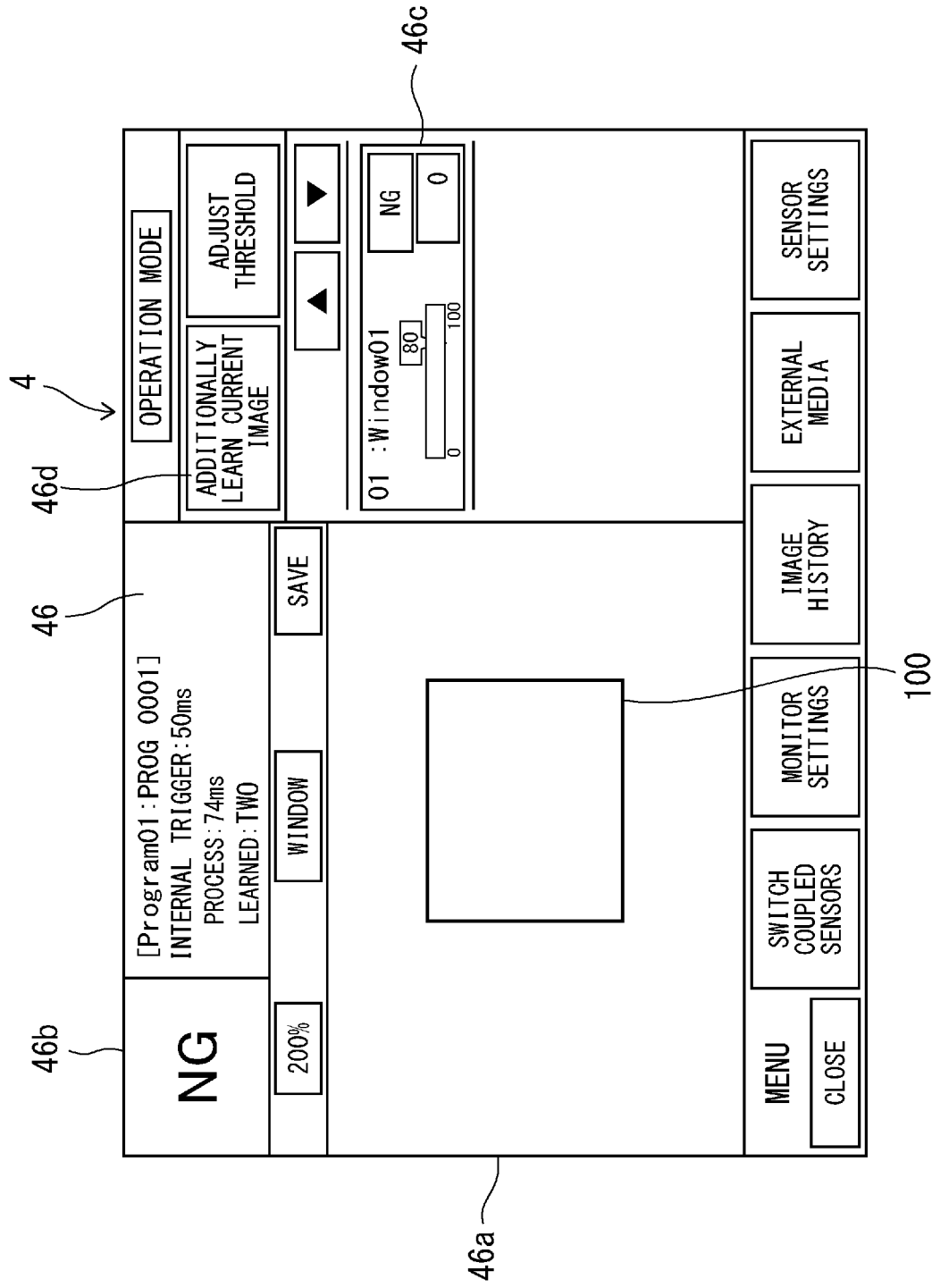
FIG. 16 shows a user interface in a case in which an inspection object image is a defective product image.

For example, the determination result of the inspection object image is notified to a user by using a determination result display user interface 46, as shown in FIGS. 15 and 16. The determination result display user interface 46 is generated by the controller 13A of the main board 13 and is displayed on the display device 4. The determination result display user interface 46 is provided with an image display region 46a that displays an inspection object image, a result display region 46b that displays a determination result, and a reliability display region 46c that displays a reliability of the determination result. In response to input of an inspection object image by the image input unit 21, the input inspection object image is displayed in the image display region 46a. In a case in which the inspection object image is determined as being a non-defective product image, "OK" is displayed in the result display region 46b. Conversely, in a case in which the inspection object image is determined as being a defective product image, "NG" is displayed in the result display region 46b. The indications of "OK" and "NG" are examples, and the indications may be any form that enables distinguishing between a non-defective product image and a defective product image. For example, a non-defective product and a defective product may be distinguished by color of the result display region 46b, a symbol displayed in the result display region 46b, or other manner.

The reliability display region 46c displays numerical values from 0 to 100 and a bar with a length corresponding to the numerical values. As the numerical value increases, the reliability of the determination result that the inspection object image is a non-defective product image, is higher. In one example, the reliability of the determination is calculated on the basis of a distance between the classification boundary 51 and the inspection object image determined as a non-defective product image in the feature space 50 shown in FIG. 13A. The reliability is determined as being low in a case in which the distance between the classification boundary 51 and the inspection object image determined as a non-defective product image is short, whereas the reliability is determined as being high in a case in which this distance is long.

In step SB3 in the flowchart shown in FIG. 14, whether there is a low-reliable image is determined. As in a case in which an inspection object image input by the image input unit 21 is close to the classification boundary 51 in the feature space 50 shown in FIG. 13A, an image that is difficult to determine whether it is a non-defective product image or a defective product image has a low reliability, and such an image is called a low-reliable image. If it is determined that there is no low-reliable image in step SB3, the procedure advances to step SB1, and a next inspection object image is input and is subjected to the pass/fail determination. If it is determined that there is a low-reliable image in step SB3, the procedure advances to an additional image input step in step SB4.

Figure 13B:
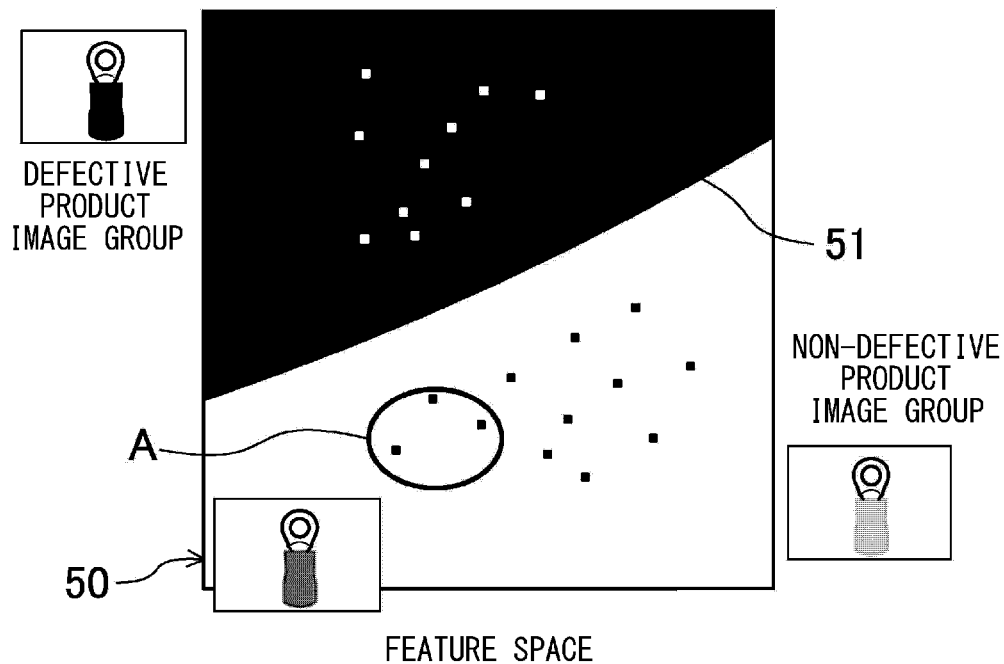
FIG. 13B schematically shows a feature space in which a classification boundary is corrected in response to addition of a non-defective product image.
Figure 17:
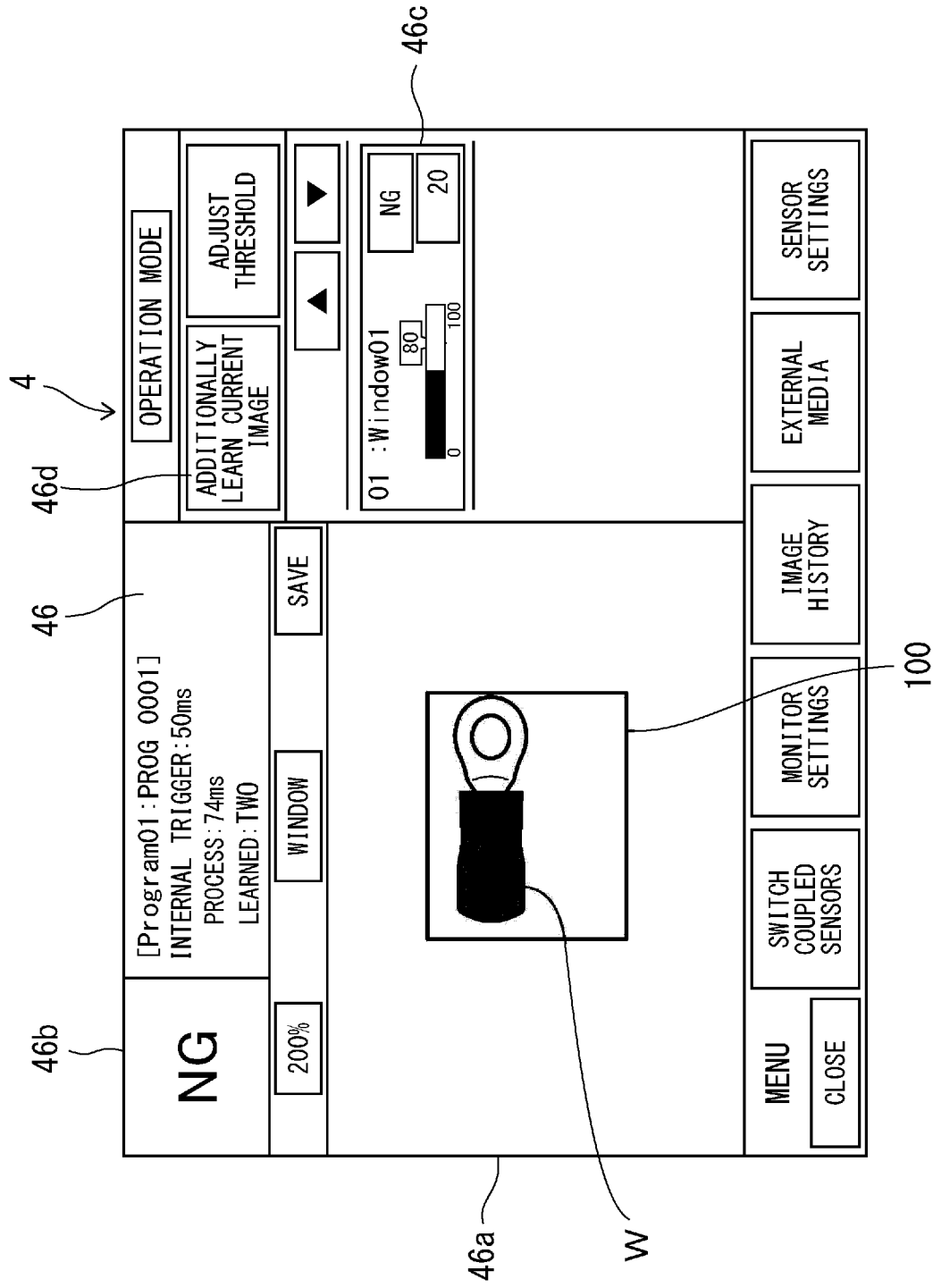
FIG. 17 shows a user interface in a case of inputting an additional image.
Figure 18:
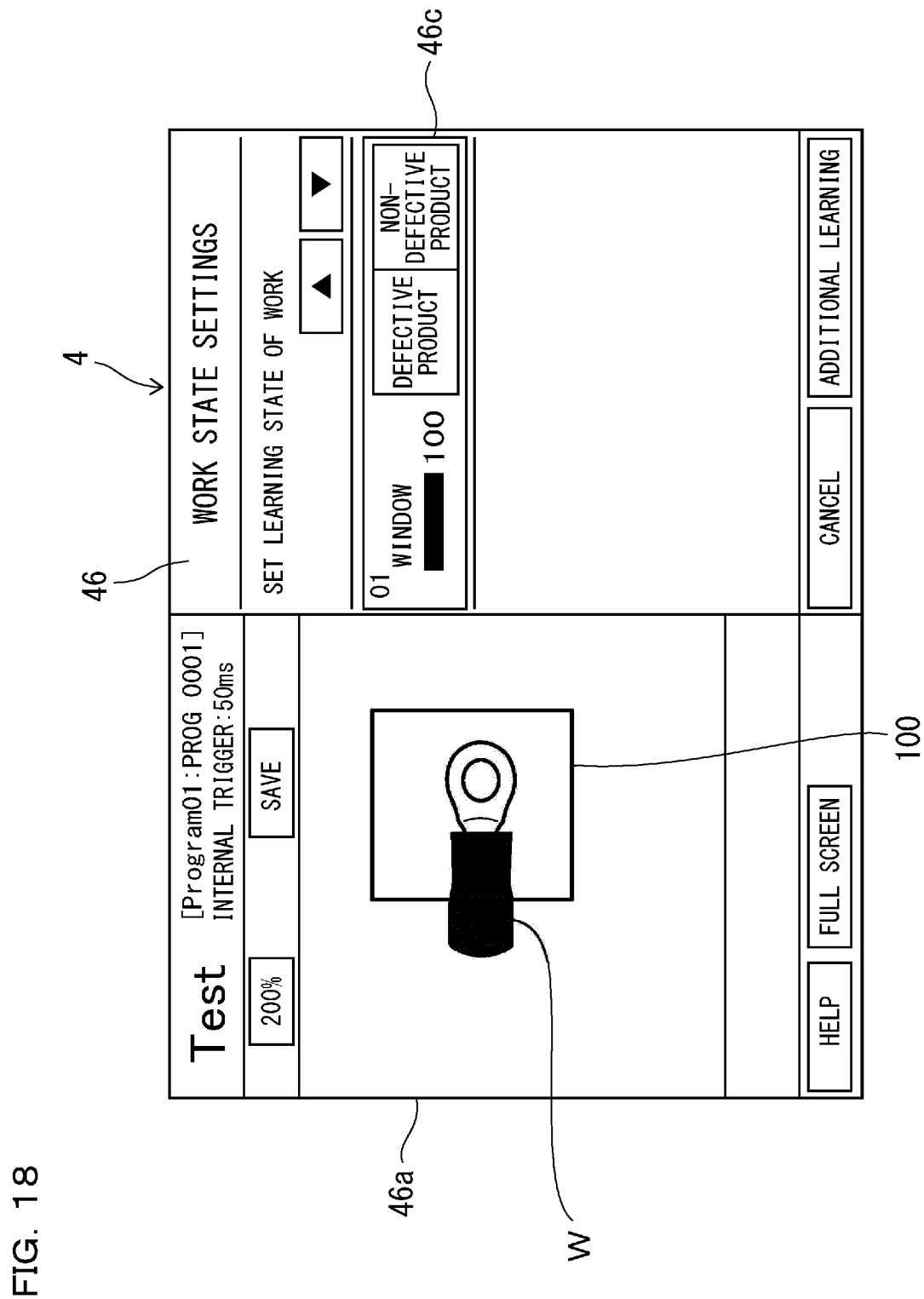
FIG. 18 shows a user interface in a case in which a user selects between a defective product and a non-defective product.

In the additional image input step, input of a non-defective product image and input of a defective product image both are allowed. As shown in FIGS. 15 to 17, the determination result display user interface 46 is provided with an additional learning button 46d for further learning an image that is displayed in the image display region 46a. FIG. 17 shows an example in which an image that is supposed to contain a non-defective product by a user is determined as being a defective product image by the image inspection apparatus 1. In this case, when the user presses the additional learning button 46d, a setting button 46e appears in the determination result display user interface 46, as shown in FIG. 18. The setting button 46e allows selection between a "defective product" and a "non-defective product". When a user selects the "defective product", the image that is displayed in the image display region 46a is input as a defective product image, to the learning processor of the classifier generator 22. When a user selects the "non-defective product", the image that is displayed in the image display region 46a is input as a non-defective product image, to the learning processor of the classifier generator 22. In the example shown in FIG. 18, an image that a user recognizes as a non-defective product image is displayed in the image display region 46a, and therefore, the user selects the "non-defective product". An additional image is input in this manner. Step SB5 in the flowchart shown in FIG. 14 is a relearning step. As shown in FIG. 13B, in a case in which a non-defective product image is added within the frame indicated by the symbol "A", this image is plotted in the feature space 50, and the classification boundary 51 is corrected.

Details of Relearning Step

Figure 19:
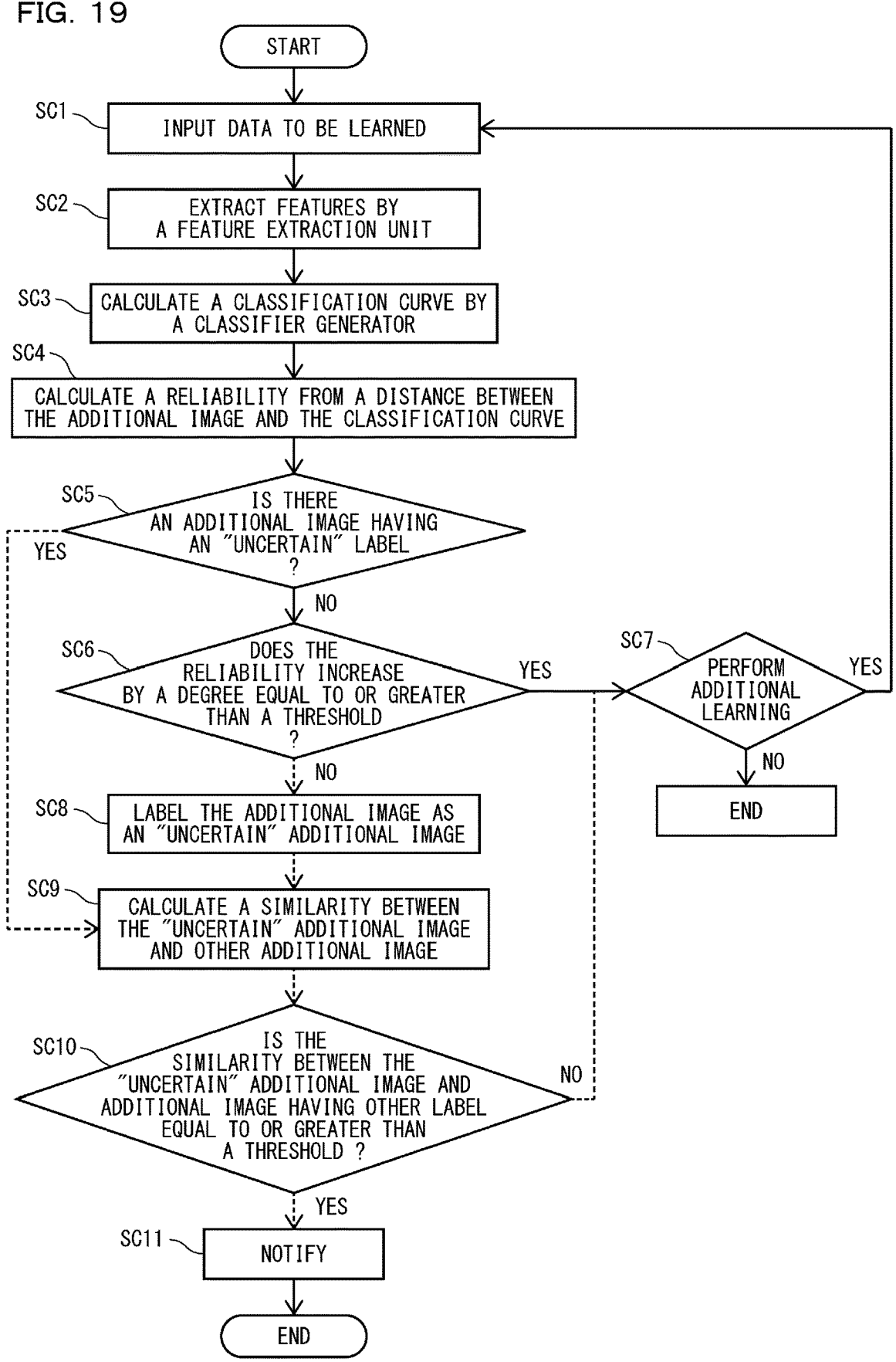
FIG. 19 is a flowchart showing a specific content of control performed by a classifier generator and a notification unit.

FIG. 19 shows a flowchart illustrating details of the relearning step and shows a procedure for implementing a function of detecting a non-defective product image or a defective product image mistakenly registered or mistakenly input by a user. For example, an additional image that is newly input to the learning processor by a user is added with an attribute as either one of a non-defective product and a defective product by the user in step SB4 in the flowchart shown in FIG. 14. However, the user may mistakenly recognize a non-defective product image as containing a defective product or mistakenly recognize a defective product image as containing a non-defective product, and therefore, there is a risk of adding a wrong attribute to the additional image.

This embodiment includes a notification unit 26, which is shown in FIG. 3. An additional image that is added with an attribute as either one of a non-defective product and a defective product by a user, is newly input to the learning processor, and the additional image is plotted in the feature space 50, as shown in FIG. 13A or other drawing. In these conditions, the probability that the attribute of the additional image is wrong is estimated on the basis of a distance between the position of the additional image in the feature space 50 and the classification boundary 51 or a representative point of images having the other attribute. In the case in which the attribute of the additional image is expected to be wrong, the notification unit 26 provides a notification of the probability of wrong attribute of the additional image.

The following describes a specific content of control performed by the classifier generator 22 and the notification unit 26. In step SC1 following start of the procedure in the flowchart shown in FIG. 19, data to be learned, that is, an additional image, is input. This process is executed in step SB4 in the flowchart shown in FIG. 14, and thus, the additional image is added with an attribute as either one of a non-defective product and a defective product by a user. In the following step SC2, a feature of the additional image is extracted by the feature extraction unit 25. Next, in step SC3, a classification boundary 51, as shown in FIG. 13A, is calculated by the classifier generator 22. The classification boundary 51 may also be called a classification curve. In step SC4, the additional image of the learned data is plotted in the feature space 50, and a reliability is calculated from a distance between the plotted additional image and the classification boundary 51. The reliability is determined as being low in the case in which the distance between the additional image and the classification boundary 51 is short, whereas the reliability is determined as being high in the case in which this distance is long.

In step SC5, it is determined whether a label of "uncertain" is assigned to the additional image. In the case in which the additional image is a first image, there is no additional image that is assigned with the "uncertain" label, and thus, the determination result is NO and the procedure advances to step SC6. In step SC6, whether the reliability of the additional image is equal to or greater than a threshold is determined. If the reliability of the additional image is equal to or greater than the threshold, the determination result is YES, and the procedure advances to step SC7. In step SC7, it is determined whether there is a next additional image, that is, whether to perform the additional learning. If the additional learning is to be performed, the procedure advances to step SC1. Otherwise, if the additional learning is not performed, the procedure is finished.

If the reliability of the additional image is less than the threshold, the determination result is NO in step SC6, and the procedure advances to step SC8, whereby the additional image is labeled as "uncertain". The label of "uncertain" suggests that the attribute of the additional image may be wrong, and this estimation is based on the reliability. In step SC9, if there already exists an additional image having the "uncertain" label, a similarity between the additional image having the "uncertain" label and other additional image is calculated. Specifically, whether the additional image having the "uncertain" label and other additional image are similar to each other, is determined by image processing, and if they are similar to each other, the similarity is determined as being high. For example, the similarity of the image is represented by a numerical value.

In step SC10, it is determined whether the similarity between the newly added additional image having the "uncertain" label and other additional image having the "uncertain" label is equal to or greater than a threshold. If the similarity is less than the threshold, the determination result is NO in step SC10, and the procedure advances to step SC7. Otherwise, if the determination result is YES in step SC10, the procedure advances to step SC11, and the notification unit 26 shown in FIG. 3 notifies a user of the probability of wrong attribute of the additional image. The notification method is not specifically limited. For example, the notification of the probability of wrong attribute of the additional image may be performed by displaying a message on the display device 4 or by sound. In the case in which there is no image having the "uncertain" label, the processing follows the flow shown by solid lines in FIG. 19.

In the case in which a distance between the position of an additional image, which is added with an attribute as either one of a non-defective product and a defective product, in the feature space 50, as shown in FIG. 13A, and a representative point of the images of the other attribute, is less than the threshold, the notification unit 26 may estimate that the attribute of the additional image may be wrong. The representative point is a point closest to the additional image, among multiple images having the other attribute, which are plotted in the feature space 50. Alternatively, the representative point may be a centroid of multiple images having the other attribute, which are plotted in the feature space 50.

In a case in which, compared with a distance between the position of the additional image in the feature space 50 and a representative point of the images having an attribute as either one of a non-defective product and a defective product, the distance between the position of the additional image in the feature space 50 and the representative point of the images with the other attribute is short, the notification unit 26 may expect that the attribute of the additional image is wrong.

In response to notification of the notification unit 26, a user may correct the attribute of the additional image. As shown in FIG. 3, the image inspection apparatus 1 includes a selection unit 27. The selection unit 27 receives result of selection by a user whether to correct the attribute of the additional image when the notification unit 26 provides the notification of the probability of wrong attribute of the additional image. The selection unit 27 may make a selection button, such as the setting button 46e in the user interface shown in FIG. 18, appear in the display device 4 to allow a user to select one of the "non-defective product" and the "defective product". The additional image is added with an attribute as a defective product when the user selects the "defective product", and the additional image is added with an attribute as a non-defective product when the user selects the "non-defective product". There may be cases in which the notification from the notification unit 26 is wrong, and thus, the final determination is entrusted to a user. When the attribute of the additional image is determined on the basis of the result of selection performed by using the selection unit 27, the classifier generator 22 corrects the classification boundary 51 in accordance with the determined attribute.

Figure 20A:
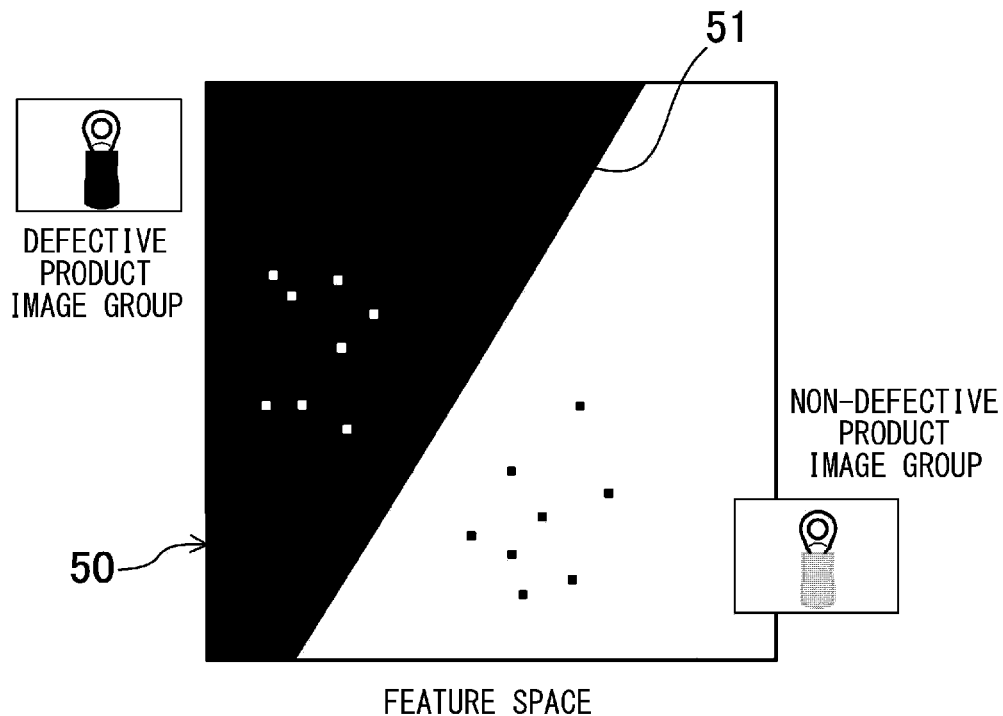
FIG. 20A schematically shows a feature space in which a non-defective product image group and a defective product image group are plotted.
Figure 20B:
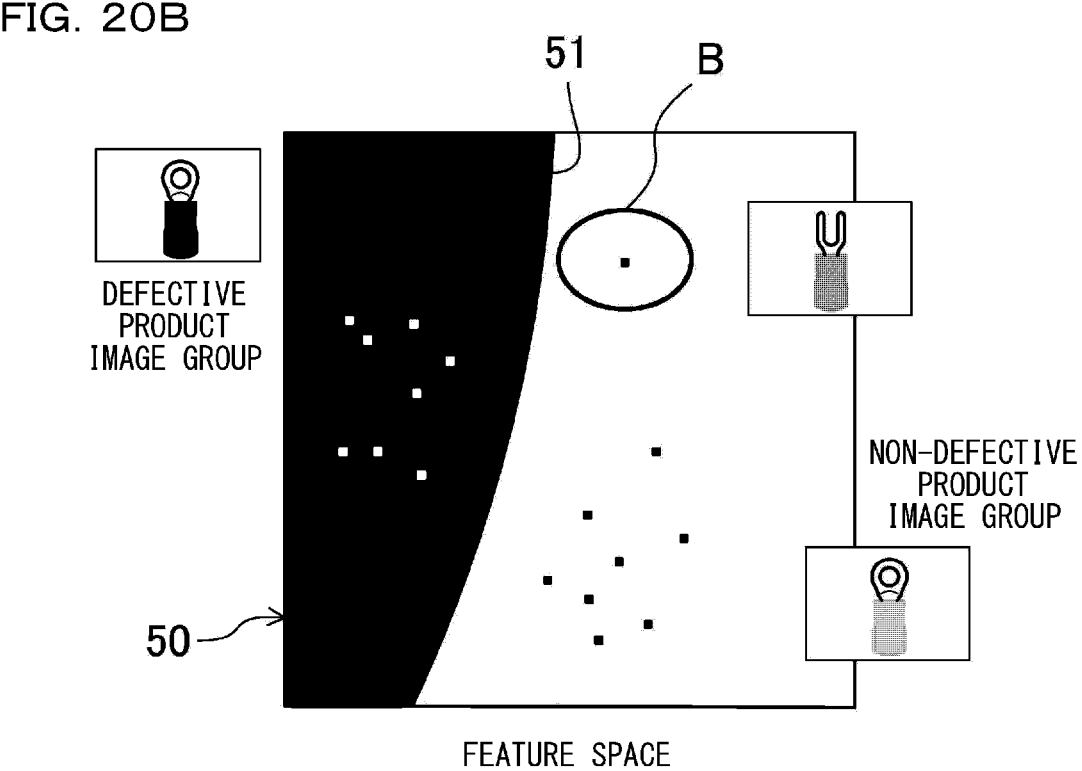
FIG. 20B schematically shows a feature space in which a classification boundary is corrected in response to addition of an image of a non-defective product of a new type.
Figure 21:
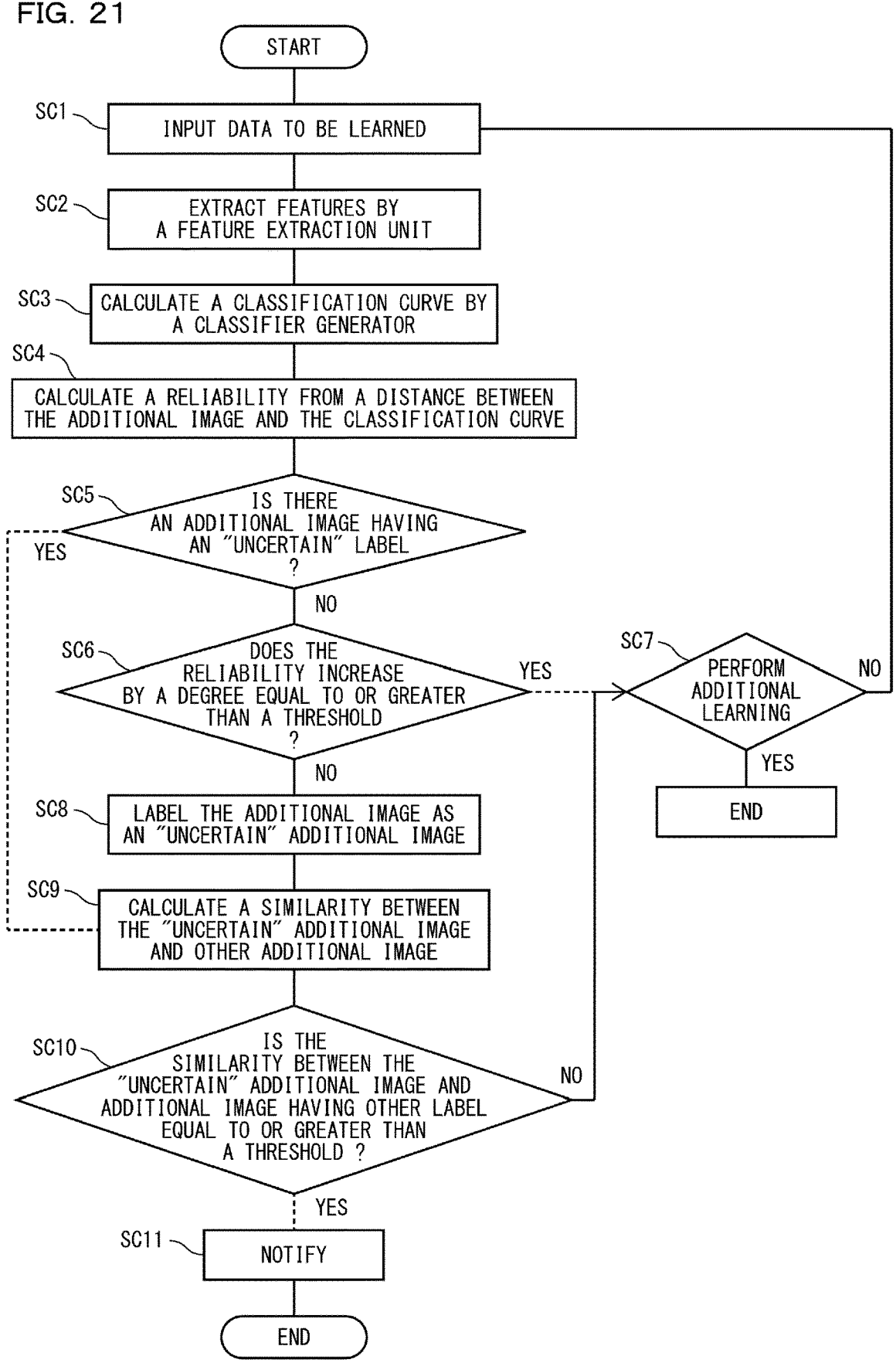
FIG. 21 corresponds to FIG. 19 for explaining a processing flow in the case in which an image of a non-defective product of a new type is added.

FIG. 20A schematically shows a feature space in which a non-defective product image group and a defective product image group are plotted. FIG. 20B schematically shows a feature space in which a classification boundary is corrected in response to addition of an image containing a non-defective product of a new type that is different from the type of the non-defective products in the images already registered. In this case, the processing advances as shown by solid lines in the flowchart shown in FIG. 21. First, the procedure advances to steps SC1, SC2, SC3, SC4, and SC5, in this order. The determination results in NO in step SC5, and the procedure advances to step SC6. Thereafter, the determination results in NO in step SC6 because the added non-defective product image contains a non-defective product of a new type, which is different from the type of the non-defective products in the images already registered, and the reliability is less than the threshold. Then, the procedure advances to steps SC8 and SC9. Next, if the similarity between the currently added additional image having the "uncertain" label and other additional image having the "uncertain" label is less than the threshold, the determination results in NO in step SC10, and the procedure advances to step SC7 without notifying a user, instead of advancing to step SC11. Thus, as shown in FIG. 20B, although the additional image greatly differs from the non-defective product images already registered and has a reliability of less than the threshold, the additional image is plotted in the feature space 50, as shown in the frame indicated by the symbol "B", whereby the classification boundary 51 is corrected.

Figure 22:
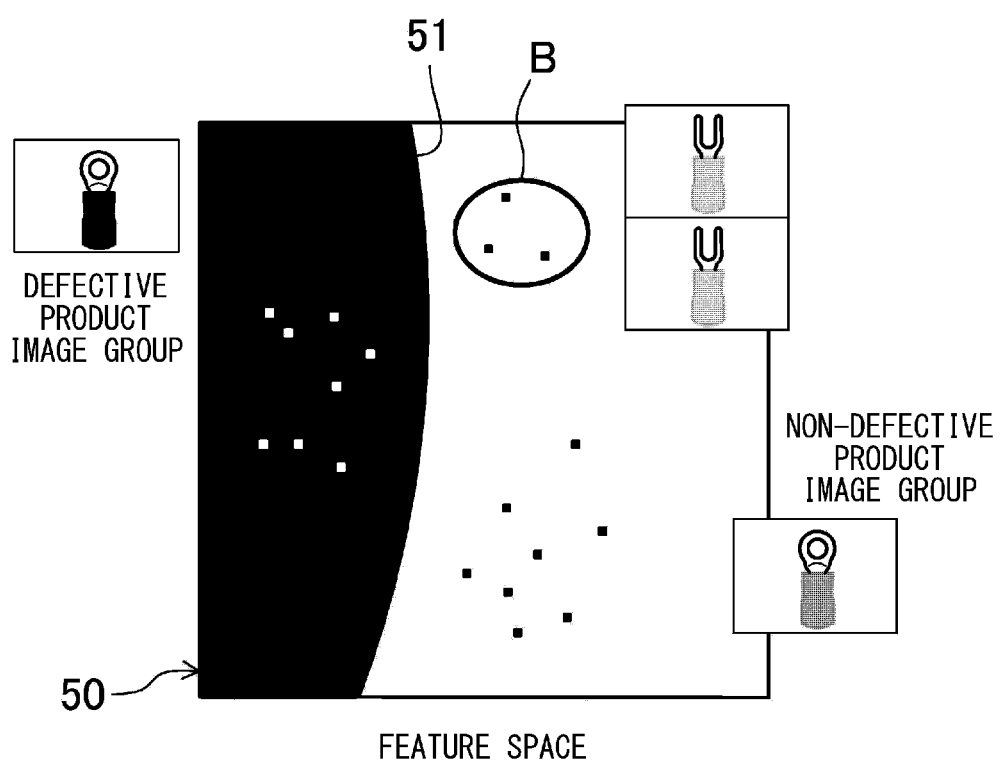
FIG. 22 schematically shows a feature space in which a classification boundary is corrected in response to further addition of an image of a non-defective product of a new type.
Figure 23:
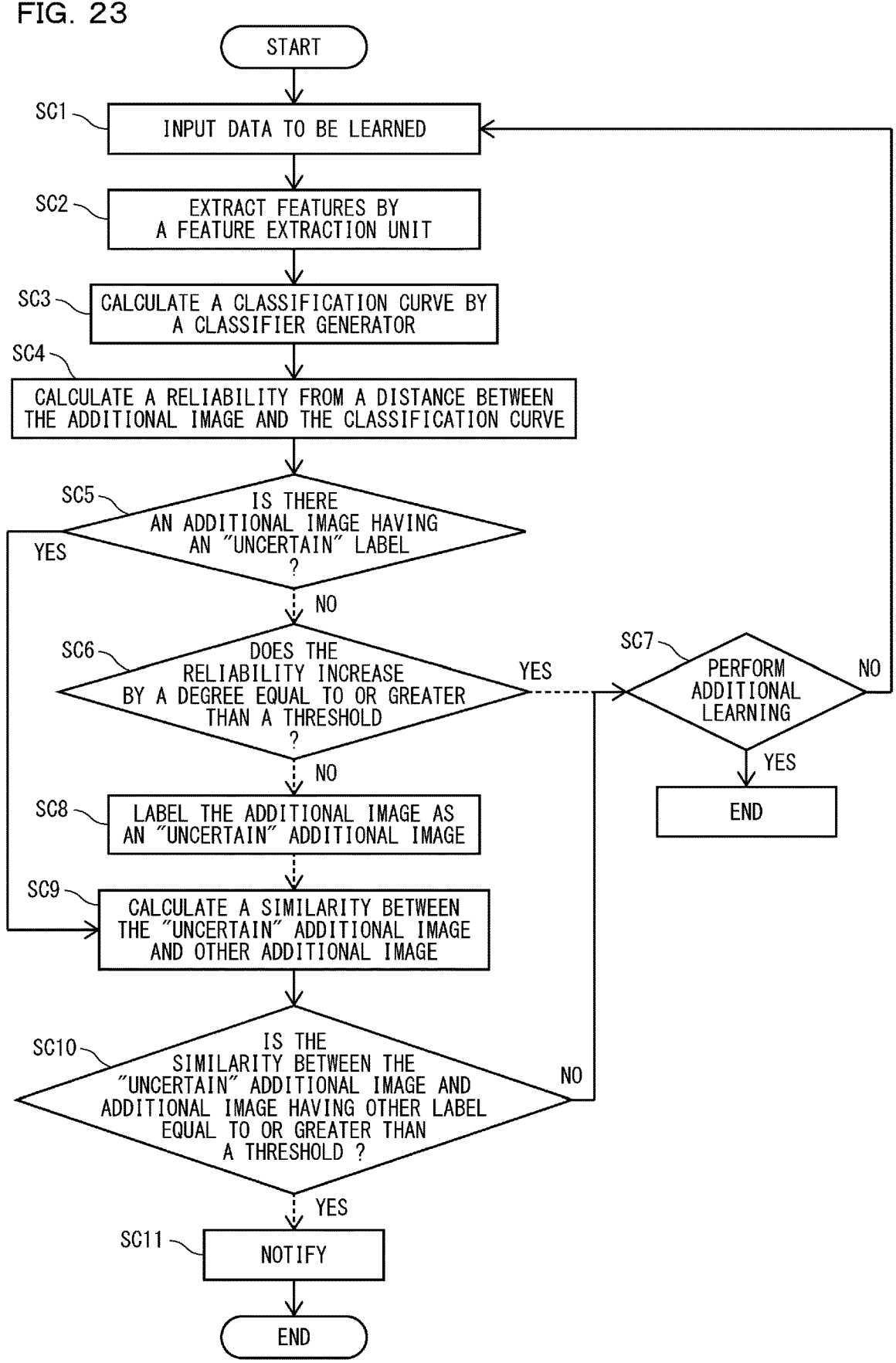
FIG. 23 corresponds to FIG. 19 for explaining a processing flow in the case in which an image of a non-defective product of a new type is further added.

FIG. 22 schematically shows a feature space in which a classification boundary is corrected in response to further addition of an image of a non-defective product of a new type. When an image containing a non-defective product of a new type is further added, the processing advances as shown by solid lines in the flowchart shown in FIG. 23. First, the procedure advances to steps SC1, SC2, SC3, SC4, and SC5, in this order. In step SC5, the determination results in YES because the additional image having the "uncertain" label is already added, and the procedure advances to step SC9. Next, the procedure advances from step SC9 to step SC10. If the similarity between the currently added additional image having the "uncertain" label and other additional image having the "uncertain" label is less than the threshold, the determination results in NO in step SC10, and the procedure advances to step SC7 without notifying a user, instead of advancing to step SC11. Thus, as shown in FIG. 22, multiple additional images that greatly differ from the non-defective product images already registered and have a reliability of less than the threshold, are plotted in the feature space 50, as shown in the frame indicated by the symbol "B". As a result, the classification boundary 51 is corrected.

In other words, in the case in which the attribute of the additional image added by a user is expected to be wrong, the notification unit 26 determines whether an image having a predetermined degree or more similarly relative to this additional image is already input by the image input unit 21 and does not provide a notification of the probability of wrong attribute of the additional image when determining that no such an image is input.

Figure 24A:
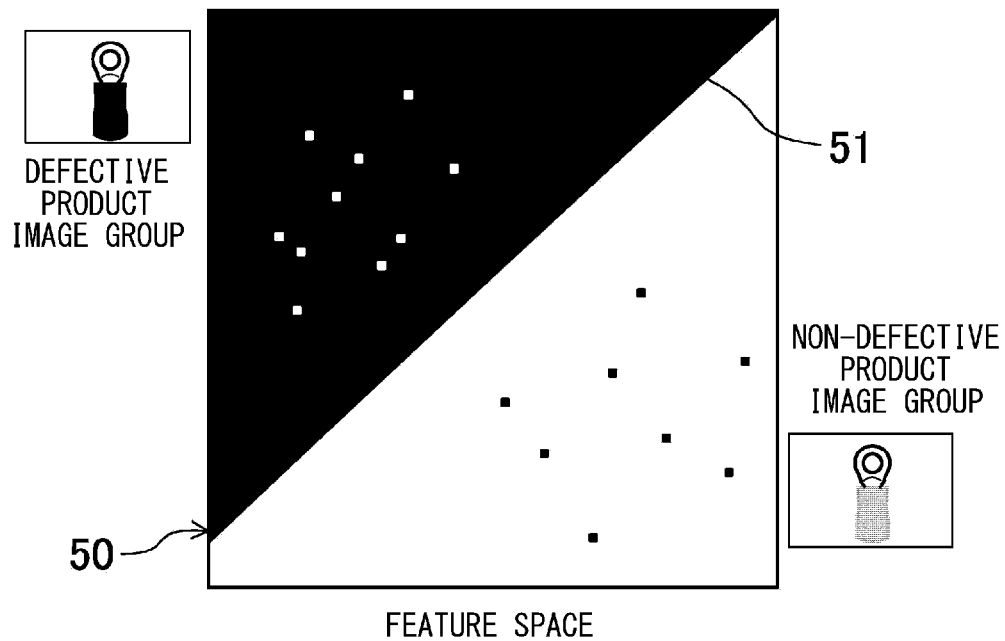
FIG. 24A schematically shows a feature space in which a non-defective product image group and a defective product image group are plotted.
Figure 24B:
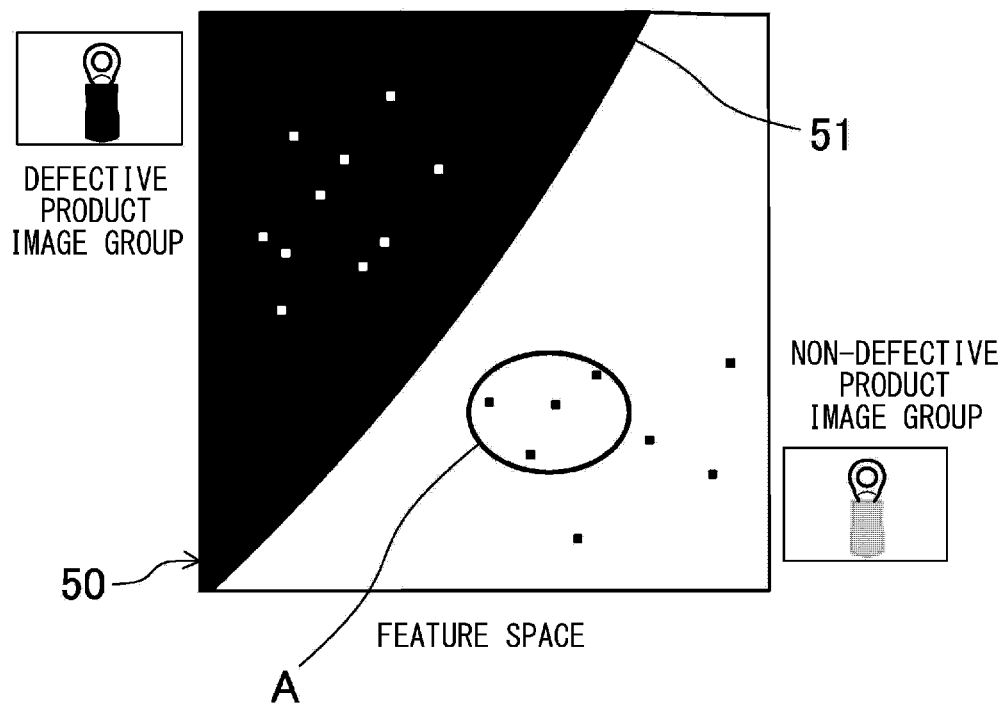
FIG. 24B schematically shows a feature space in which an existing type product is mistakenly registered.
Figure 25:
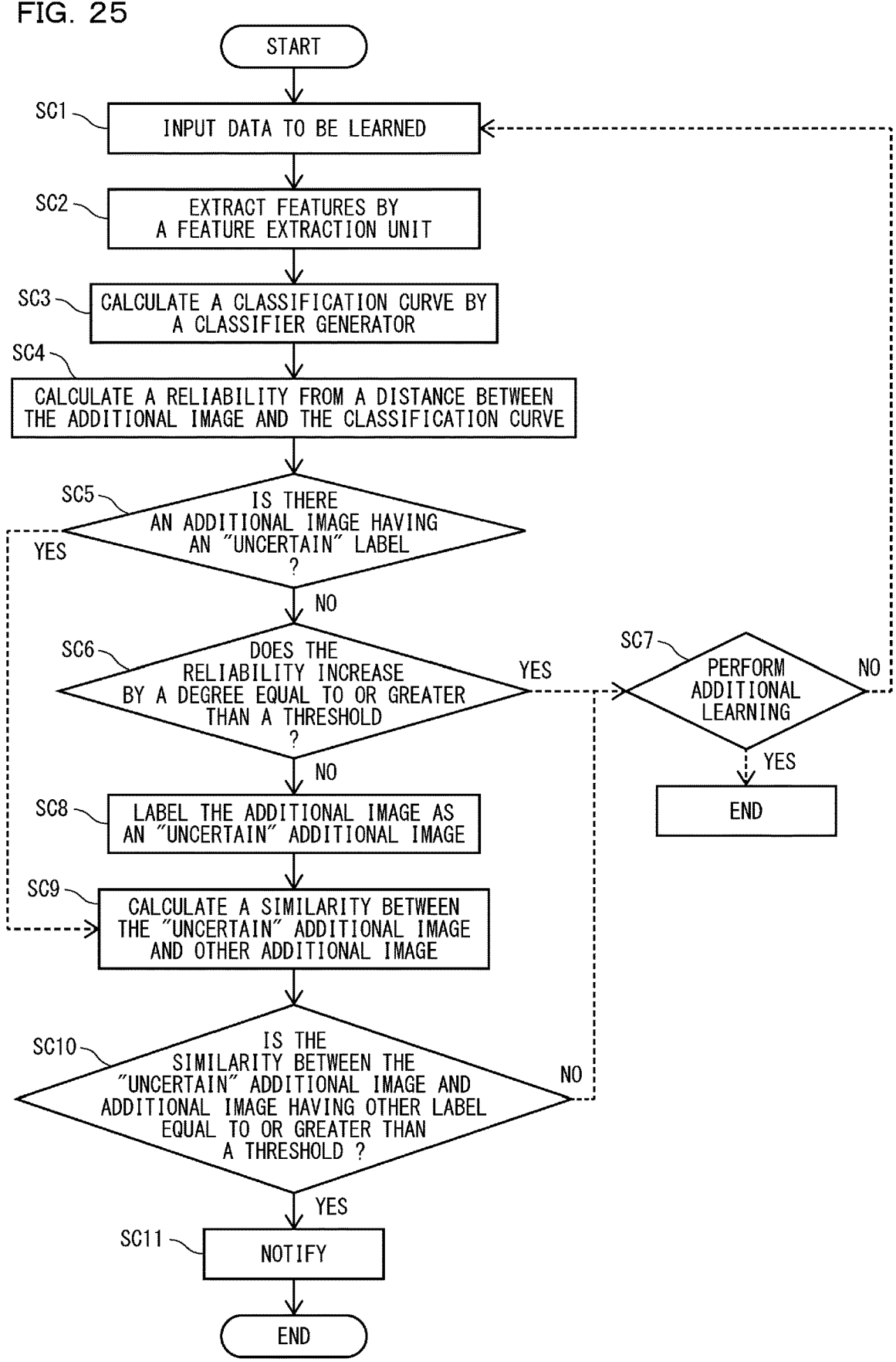
FIG. 25 corresponds to FIG. 19 for explaining a processing flow in the case in which an existing type product is mistakenly registered.

FIG. 24A schematically shows a feature space in which a non-defective product image group and a defective product image group are plotted. FIG. 24B schematically shows a feature space in which a product of an already registered type, that is, an existing type product, is mistakenly registered. In the case in which the existing type product is mistakenly registered, the processing advances as shown by solid lines in the flowchart shown in FIG. 25. First, the procedure advances to steps SC1, SC2, SC3, SC4, and SC5, in this order. The determination results in NO in step SC5, and the procedure advances to step SC6. Then, the procedure advances to steps SC8 and SC9 after the determination results in NO in step SC6. The determination results in YES in step SC10 because the similarity between the currently added additional image having the "uncertain" label and other additional image having the "uncertain" label is equal to or greater than the threshold, and the procedure advances to step SC11. Then, the notification unit 26 notifies a user of the probability of wrong attribute of the additional image.

In other words, in the state in which an additional image that is expected to have an attribute mistakenly added by a user is assigned with the "uncertain" label as a mark of the probability of erroneous registration, other additional image may be plotted in the feature space 50. In this case, when it is determined that the similarity between the other additional image and the additional image having the "uncertain" label is a predetermined degree or more, the notification unit 26 provides a notification of the probability of wrong attribute of the additional image.

Figure 26A:
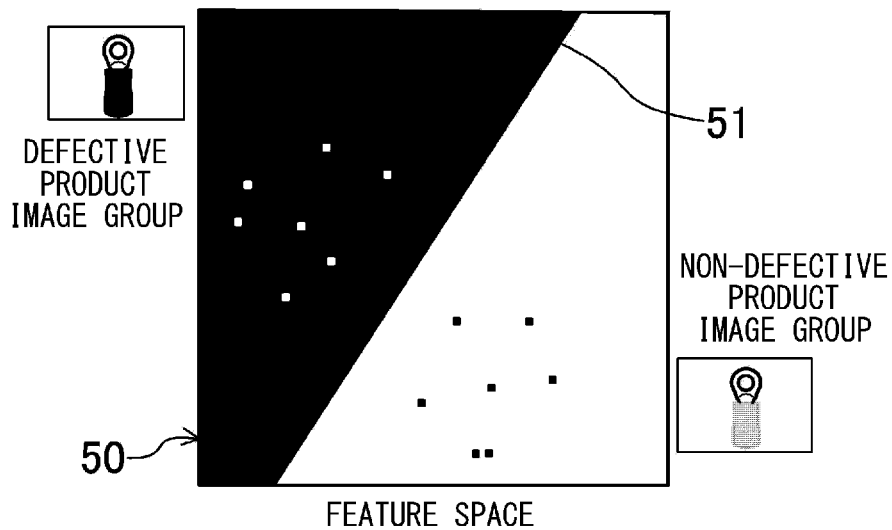
FIG. 26A schematically shows a feature space in which a non-defective product image group and a defective product image group are plotted.
Figure 26B:
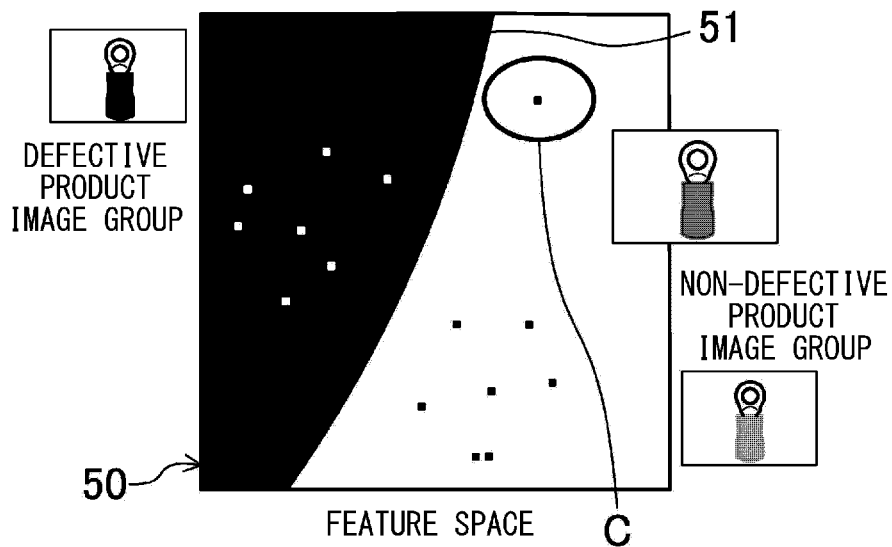
FIG. 26B schematically shows a feature space in which a defective product of a new type is mistakenly registered as a non-defective product.
Figure 26C:
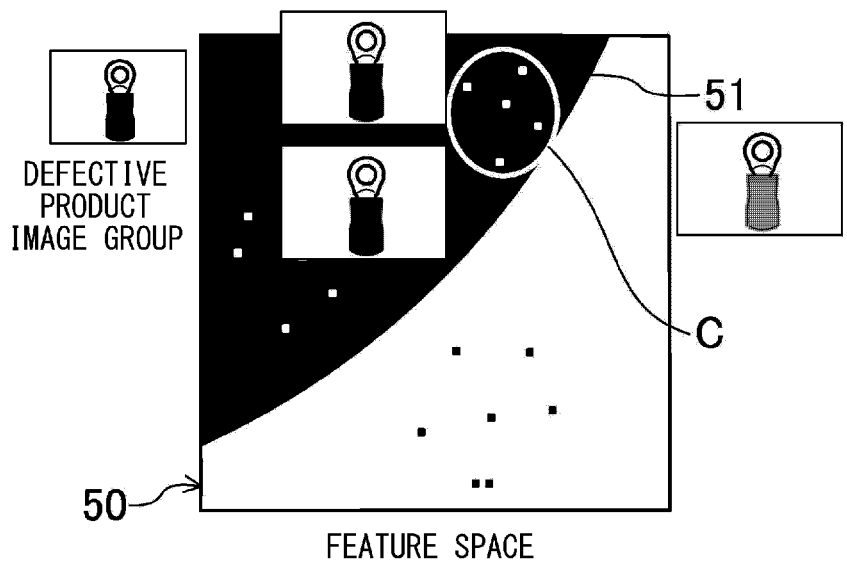
FIG. 26C schematically shows a feature space in a case in which multiple defective products of a new type are mistakenly registered as non-defective products.
Figure 27:
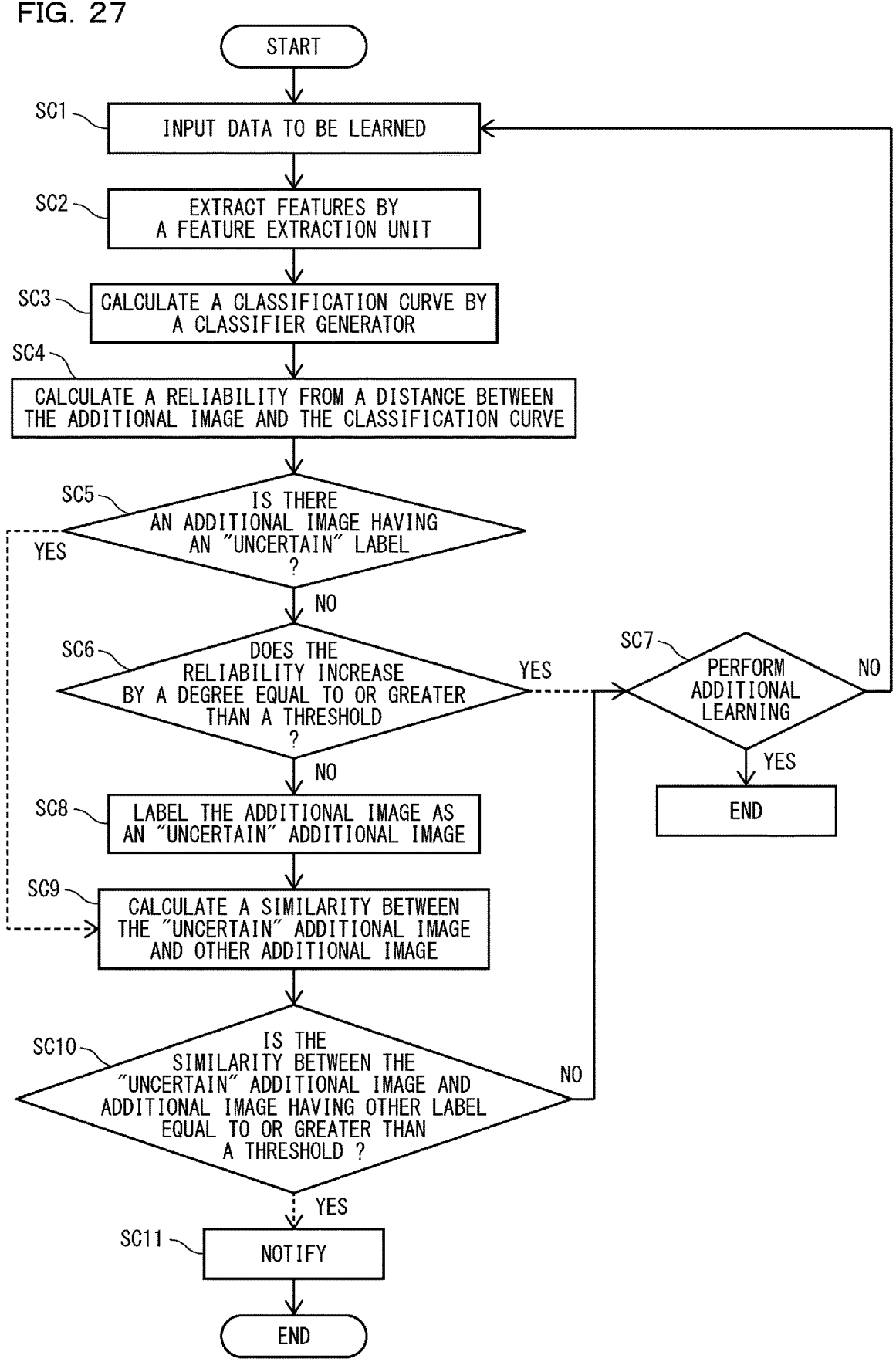
FIG. 27 corresponds to FIG. 19 for explaining a processing flow in the case in which a defective product of a new type is mistakenly registered as a non-defective product.

FIG. 26A schematically shows a feature space in which a non-defective product image group and a defective product image group are plotted. FIG. 26B schematically shows a feature space in which a defective product of a new type is mistakenly registered as a non-defective product. FIG. 26C schematically shows a feature space in a case in which multiple defective products of a new type are mistakenly registered as non-defective products. In these cases, the processing advances as shown by solid lines in the flowchart shown in FIG. 27. First, the procedure advances to steps SC1, SC2, SC3, SC4, and SC5, in this order. The determination results in NO in step SC5, and the procedure advances to step SC6. Then, the determination results in NO in step SC6 because the reliability is less than the threshold, and the procedure advances to steps SC8 and SC9. Next, if the similarity between the currently added additional image having the "uncertain" label and other additional image having the "uncertain" label is less than the threshold, the determination results in NO in step SC10, and the procedure advances to step SC7 without notifying a user, instead of advancing to step SC11. Thus, as shown in FIG. 26B, although the additional image greatly differs from the non-defective product images already registered and has a reliability of less than the threshold, the additional image is plotted, as shown in the frame indicated by the symbol "C", whereby the classification boundary 51 is corrected. However, when multiple images that are similar to the image having the "uncertain" label and have a label other than the label of the image having the "uncertain" label, are detected, as shown in FIG. 26C, the determination results in YES in step SC10, and the procedure advances to step SC11, whereby the notification unit 26 notifies a user of the probability of wrong attribute of the additional image. This situation represents that the previously added additional image is mistakenly registered, and a notification of erroneous registration of the previously added additional image is also provided.

When the notification unit 26 provides a notification of the probability of wrong attribute of the additional image, the other additional image having a predetermined degree or more similarity relative to the additional image having the "uncertain" label as well as the additional image having the "uncertain" label is displayed on the display device 4 by the controller 13A. This enables checking the multiple additional images that are expected to have a wrong attribute, at a time.

Procedure of Detecting Low-Reliable Image

Figure 28:
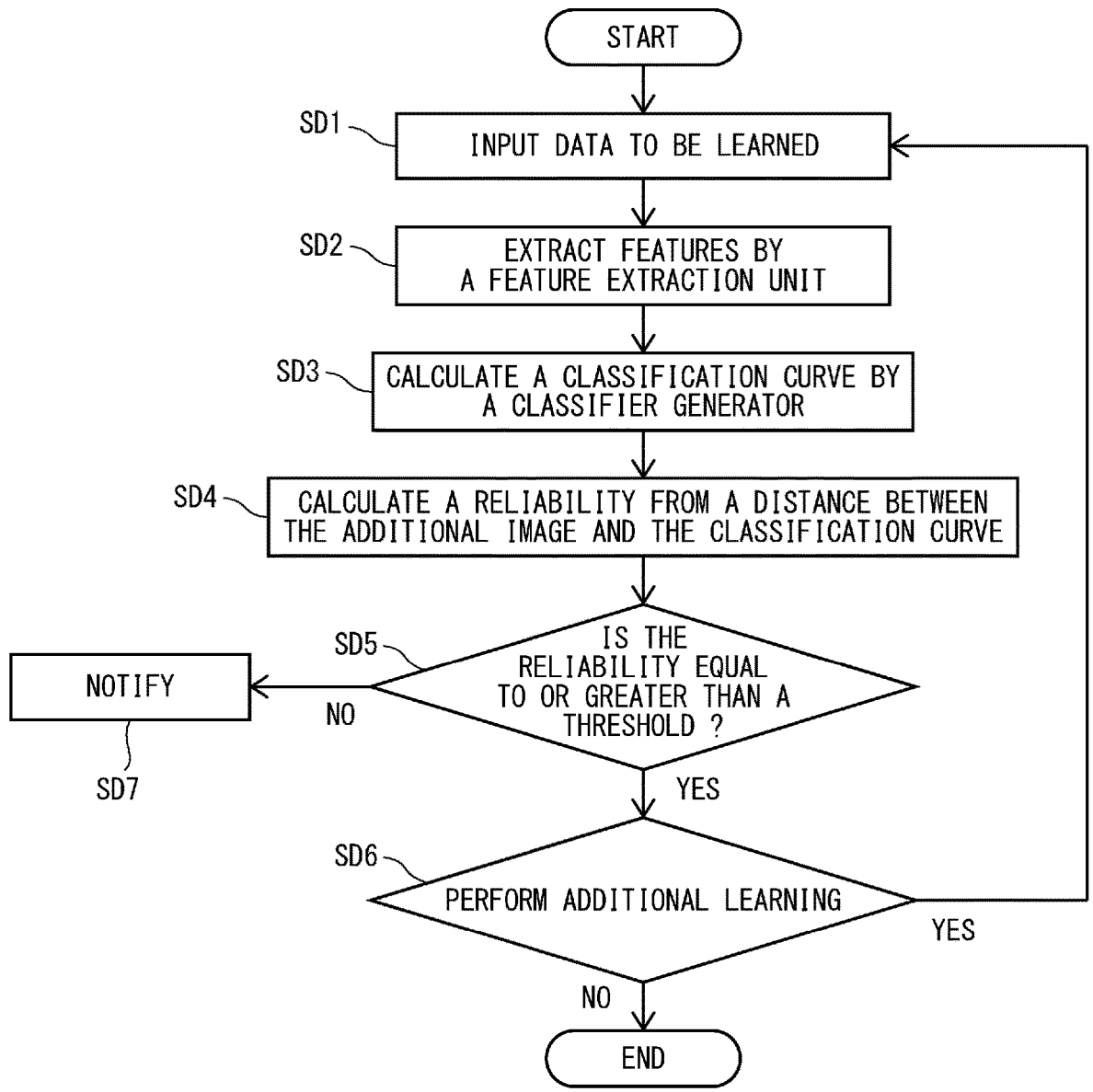
FIG. 28 is a flowchart showing a procedure for determining whether there is a low-reliable image.
Figures 29, 30:
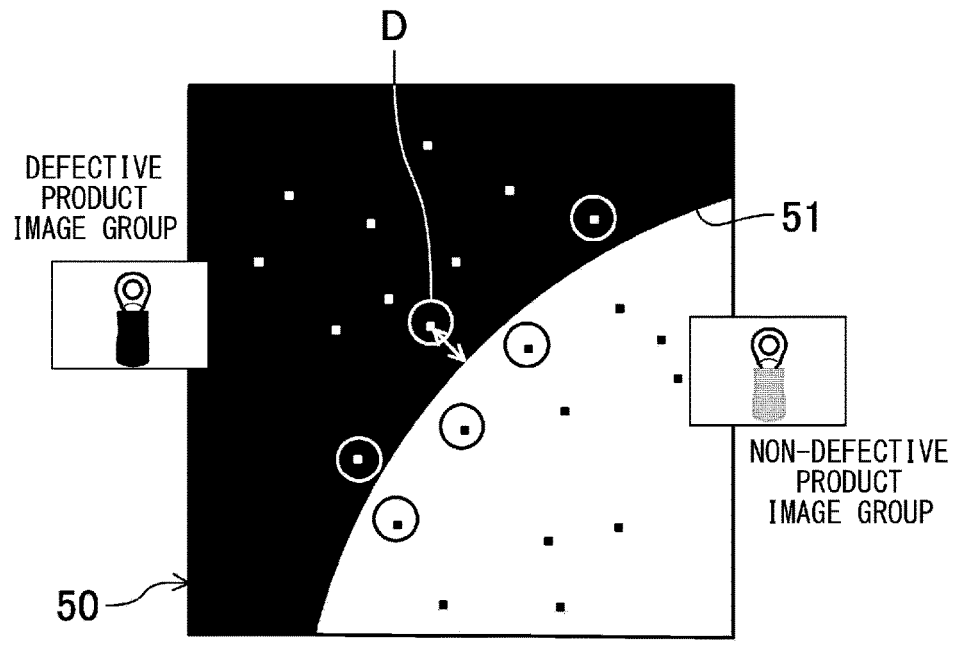
FIG. 29 schematically shows a feature space in the case of determining whether there is a low-reliable image.
FIG. 30 shows a calculation method of a distance between a classification boundary and an additional image plotted in a feature space.

Next, a procedure for detecting a low-reliable image will be described with reference to the flowchart shown in FIG. 28. In step SD1 following start of the procedure, data to be learned, that is, an additional image, is input. This process is executed in step SB4 in the flowchart shown in FIG. 14, and thus, the additional image is added with an attribute as either one of a non-defective product and a defective product by a user. In the following step SD2, a feature of the additional image is extracted by the feature extraction unit 25. Next, in step SD3, a classification boundary or a classification curve 51, as shown in FIG. 29, is calculated by the classifier generator 22. In step SD4, the additional image of the learned data is plotted in the feature space 50, and a reliability is calculated from a distance between the plotted additional image and the classification boundary 51. For example, in a case in which an additional image is plotted in the frame indicated by the symbol "D" in FIG. 29, a distance between this additional image and the classification boundary 51 is calculated. The distance is calculated from the formula shown in FIG. 30. However, the numerator is f(x) and is fixed at plus or minus 1, and therefore, only the value $\|w\|$ is evaluated.

In step SD5, whether the reliability is equal to or greater than a threshold is determined. If the reliability is equal to or greater than the threshold, the determination results in YES, and the procedure advances to step SD6. In step SD6, it is determined whether there is a next additional image, that is, whether to perform the additional learning. If the additional learning is to be performed, the procedure advances to step SD1. Otherwise, if the additional learning is not performed, the procedure is finished. If the determination result is NO in step SD5, the procedure advances to step SD7, and the notification unit 26 notifies a user of the probability of wrong attribute of the additional image. In the case in which the notification unit 26 provides the notification of the probability of wrong attribute of the additional image, the selection unit 27 receives result of selection by a user whether to correct the attribute of the additional image.

Notification of Degree of Contribution to Learning

The reliability is calculated on the basis of a distance between the position of an additional image, which is added with an attribute as either one of a non-defective product and a defective product by a user, in the feature space 50, and a representative point of the images of the other attribute. In the case in which the calculated reliability is less than a predetermined degree, the notification unit 26 provides a notification that the additional image has no contribution to learning, which is performed by the learning processor. Specifically, for example, the graph shown in FIG. 31 has a lateral axis that shows the number of learned images, that is, the number of non-defective product images input by the image input unit 21, and has a vertical axis that shows the value $\|w\|$.

Figure 31:
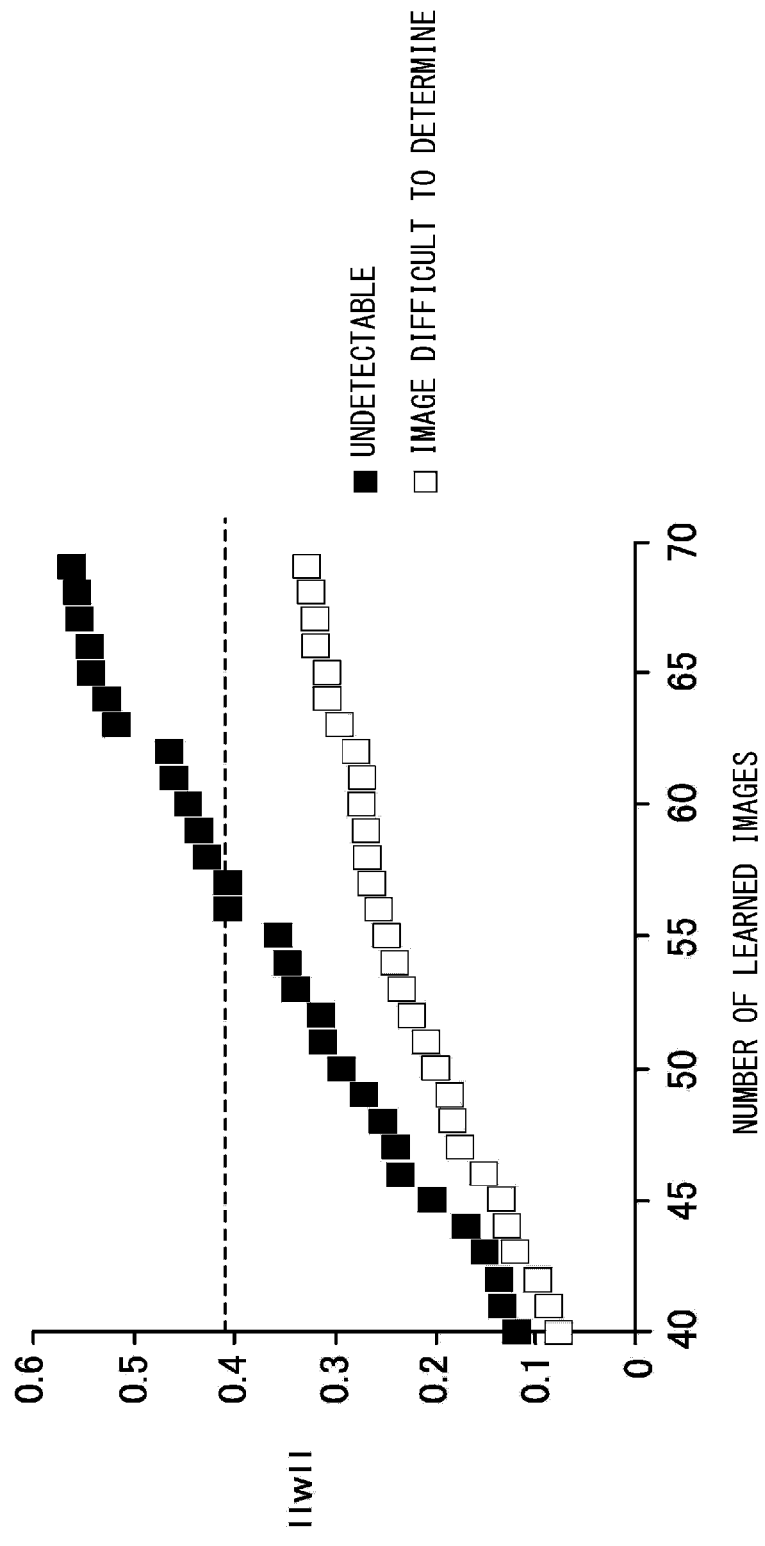
FIG. 31 is a graph showing a relationship between the number of learned images and a learning effect.

In the graph shown in FIG. 31, the value $\|w\|$ increases approximately monotonously. In view of this, once the value $\|w\|$ exceeds a threshold, which is represented by a dashed line, the learning processor dose not return to the detectable region of the inspection object W although additional learning is performed. That is, when the learning processor enters the region in which an additional image does not further contribute to learning, the notification unit 26 notifies a user that the additional image does not contribute to learning, which is performed by the learning processor. This prompts the user to change the imaging settings, such as exposure time and amount of light, thereby guiding the user to increase the learning effect.

Automatic Window Setting Function

Next, an automatic window setting function will be described. In general, a detection region is a whole region of an image in distinguishing an image using a learning processor. However, in an actual site in which an inspection object W is inspected, an inspection object W does not occupy the entirety of an image in most cases, and an inspection object W tends to occupy a part of an image. For this reason, if the whole region of an image is used as a detection region, a part in which an inspection object W is not contained, is also subjected to learning and distinguishing, thereby causing decrease in distinguishing accuracy and elongation of processing time due to unnecessary calculation. In this embodiment, an automatic window setting function is imparted to the image inspection apparatus 1 in order to automatically set a part to be input to the learning processor while reducing the burden on a user. The automatic window setting function may be set to be effective at all time or may be set to be effective when a user requires it. An inspection window that is set by the automatic window setting function may be corrected by a user.

Figure 32:
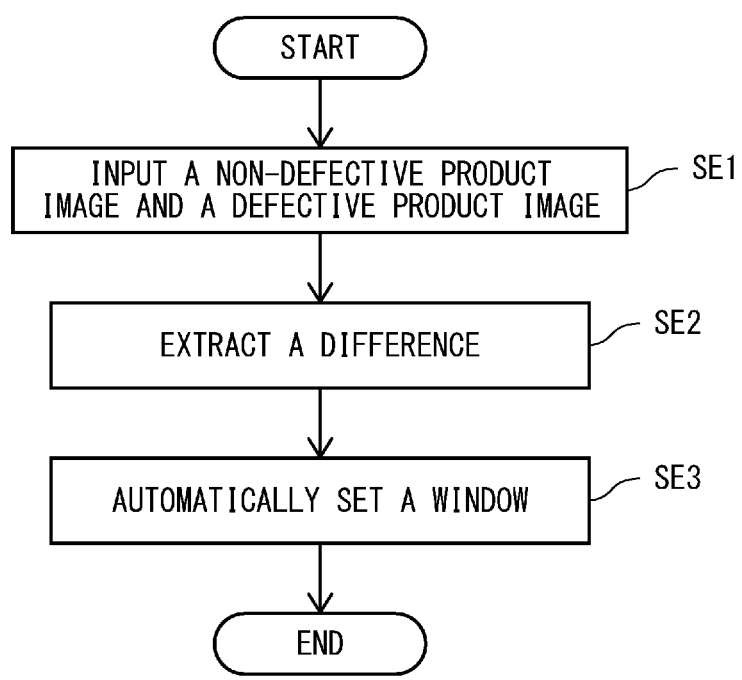
FIG. 32 is a flowchart showing a processing procedure of an automatic window setting function.

A processing procedure of the automatic window setting function is described with reference to the flowchart shown in FIG. 32. In step SE1 following start of the procedure, a non-defective product image and a defective product image are input. This process is performed by the image input unit 21. In step SE2, a difference in feature between the non-defective product image and the defective product image input by the image input unit 21, for example, a difference between the non-defective product image and the defective product image input by the image input unit 21 is extracted. Thereafter, an inspection window is automatically set to a region having the difference in feature between the non-defective product image and the defective product image, in step SE3. The inspection window is set by the first window setting unit 28 shown in FIG. 3.

Processing for automatically setting an inspection window is described with reference to FIG. 33. FIG. 33 shows a case of automatically setting an inspection window in a single region. In one example, first, a non-defective product image containing an inspection object W of a non-defective product and a defective product image containing no inspection object W are input by the image input unit 21. As shown in the drawing, the inspection object W occupies a small region relative to the whole non-defective product image, and the most part of the non-defective product image is a region that does not contribute to distinguishing. Similarly, a region that does not contribute to distinguishing is large in the defective product image.

Thereafter, the first window setting unit 28 extracts a difference between the non-defective product image and the defective product image. Thus, a region having a difference in feature between the non-defective product image and the defective product image is determined. The first window setting unit 28 automatically sets an inspection window 100 to the region having the difference in feature between the non-defective product image and the defective product image. The inspection window 100 may have a circumscribed rectangle shape surrounding the region having the difference in feature between the non-defective product image and the defective product image, but the shape is not limited thereto and may be a circumscribed circle shape, for example. The region having the difference in feature is automatically surrounded by the inspection window 100, and therefore, the burden on a user is not increased, and a region with a range greater than necessary is not designated.

Among a non-defective product image and a defective product image input by the image input unit 21, the classifier generator 22 inputs an image in the inspection window 100, which is set by the first window setting unit 28, to the learning processor with the multi-layered structure to generate a classifier for distinguishing between a non-defective product image and a defective product image. That is, an image in the inspection window 100 that is obtained by cropping the non-defective product image along the inspection window 100, and an image in the inspection window 100 that is obtained by cropping the defective product image along the inspection window 100, are input to the learning processor. The images in the inspection window 100 are respectively smaller than the original non-defective product image and the original defective product image, and the images in the inspection window 100 are input to the learning processor to generate a classifier for distinguishing between a non-defective product image and a defective product image. Thus, regions that do not contribute to distinguishing between a non-defective product image and a defective image are not input, thereby increasing the distinguishing accuracy and shortening the processing time.

As shown in FIG. 3, the image inspection apparatus 1 includes the second window setting unit 29. The second window setting unit 29 sets an inspection window 100 on an inspection object image that is input by the image input unit 21 in operating the image inspection apparatus 1. The region having a difference in feature between a non-defective product image and a defective product image is determined as described above. Thus, a region having a difference in feature is determined in an inspection object image on the basis of the feature of the determined region. An inspection window 100 is automatically set so as to surround the region determined in the inspection object image, whereby the burden on a user is not increased, and a region with a range greater than necessary is not designated. The second window setting unit 29 automatically sets an inspection window 100 that has the same shape and the same dimensions as the inspection window 100 set by the first window setting unit 28, on the inspection object image input by the image input unit 21 in operating the image inspection apparatus 1. The first window setting unit 28 and the second window setting unit 29 are conceptually described as separate components. For example, the second window setting unit 29 may be omitted, and the first window setting unit 28 may set the inspection window 100 on an inspection object image in operating the image inspection apparatus 1. In this case, one window setting unit is used.

The pass/fail determination unit 30 shown in FIG. 3 inputs an image in the inspection window 100 set by the second window setting unit 29, to the classifier to perform pass/fail determination of an inspection object image containing the input image. For example, an image in the inspection window 100 is plotted in the feature space 50, as shown in FIG. 13A. The inspection object image is determined as containing a non-defective product when the plotted image exists in a region on the non-defective product image side relative to the classification boundary 51. The inspection object image is determined as containing a defective product when the plotted image exists in a region on the defective product image side relative to the classification boundary 51. The determination result may be displayed in the determination result display user interface 46, as shown in FIGS. 15 and 16.

Figure 34:
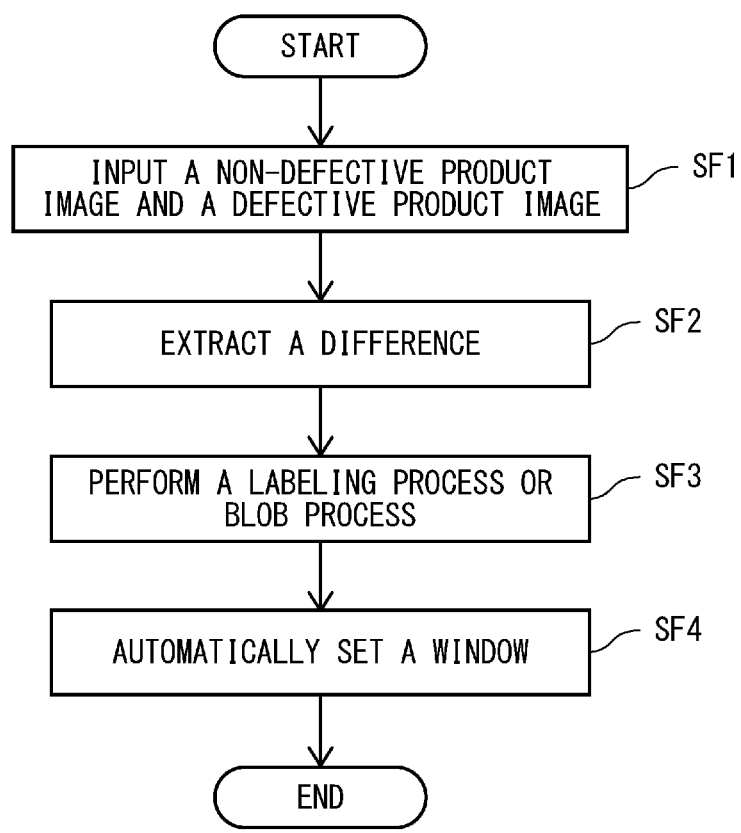
FIG. 34 is a flowchart showing a procedure for automatically setting an inspection window in each region.
Figure 35:
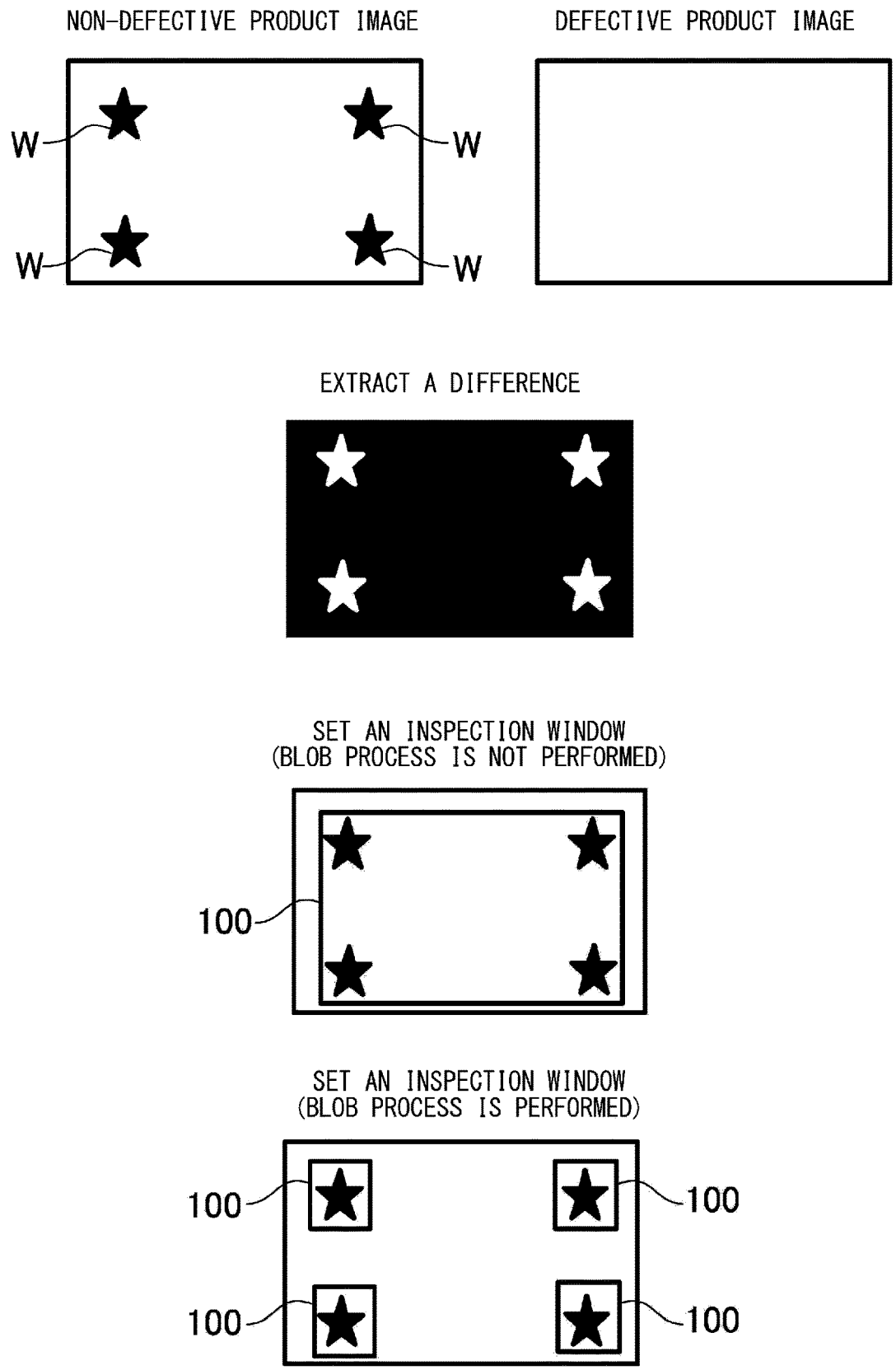
FIG. 35 is a diagram for explaining the procedure for automatically setting an inspection window in each region.

FIG. 34 is a flowchart showing a procedure for automatically setting an inspection window in each region. In step SF1 following start of the procedure, a non-defective product image and a defective product image are input. This process is performed by the image input unit 21. In step SF2, a difference in feature between the non-defective product image and the defective product image input by the image input unit 21, for example, a difference between the non-defective product image and the defective product image input by the image input unit 21 is extracted. As shown in FIG. 35, in a case in which multiple inspection objects W are contained in a mutually separated manner in a non-defective product image, the difference extraction generates mutually separated multiple regions that each have a difference in feature between the non-defective product image and the defective product image. As shown in an example of an image not subjected to a blob process, when an inspection window 100 is set so as to surround all of the multiple regions, the inspection window 100 is large and contains a large region that does not contribute to distinguishing between a non-defective product image and a defective product image. This can cause decrease in the distinguishing accuracy and elongation of the processing time.

From this point of view, in this embodiment, a blob process is performed in step SF3 in the flowchart in FIG. 34, and an inspection window 100 is then automatically set with respect to each of the regions in step SF4. Specifically, the first window setting unit 28 determines whether the dimensions of the inspection window 100 to be set are predetermined degrees or more. In the case in which the dimensions of the inspection window 100 to be set are predetermined degrees or more, the blob process is performed to a non-defective product image or a defective product image to assign labels, and an inspection window 100 with dimensions less than predetermined degrees is set to each of the labeled blob regions. In the case in which the dimensions of the inspection window 100 to be set are less than the predetermined degrees, the blob process may be canceled.

In the example shown in FIG. 35, there are four regions that each have a difference in feature between a non-defective product image and a defective product image, and these regions are positioned in the vicinities of four corners of the non-defective product image. Performing the blob process identifies respective regions that each have the difference in feature. The first window setting unit 28 sets multiple inspection windows 100 so as to respectively surround the four regions. This processing reduces an unnecessary region in an image to be input to the learning processor, thereby increasing the distinguishing accuracy. Similarly, multiple inspection windows 100 may be set during operation.

Figure 36:
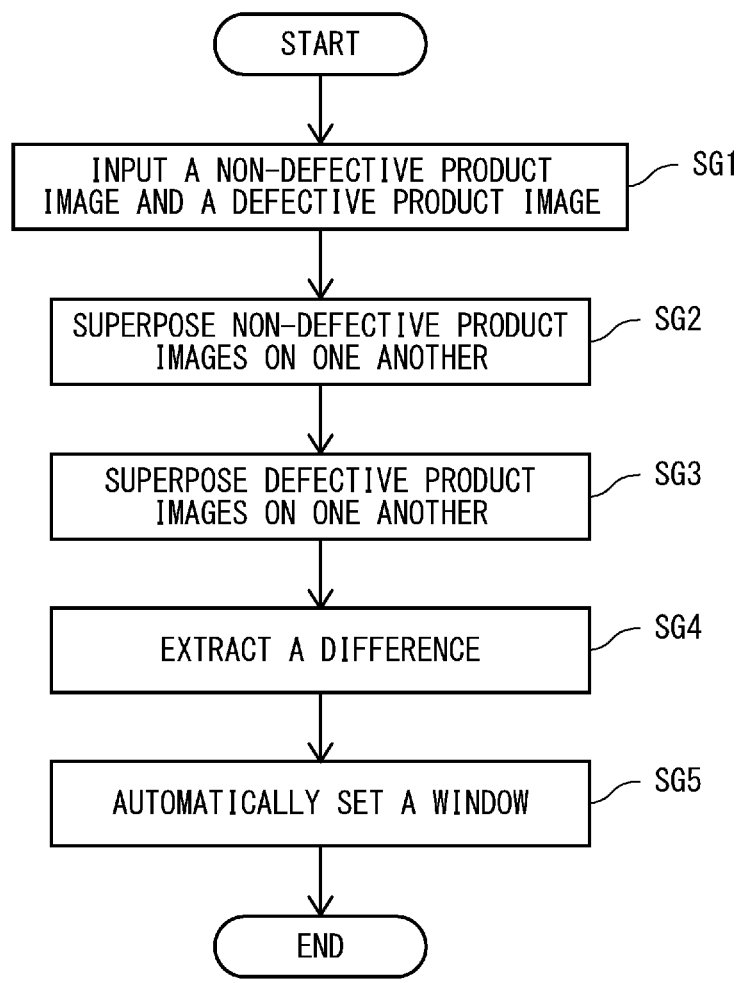
FIG. 36 is a flowchart showing a procedure for automatically setting an inspection window after multiple regions are superposed on one another.

FIG. 36 is a flowchart showing a procedure for automatically setting an inspection window after multiple regions are superposed on one another. In step SG1 following start of the procedure, multiple non-defective product images and multiple defective product images are input. This process is performed by the image input unit 21. In step SG2, the multiple non-defective product images are superposed on one another. For example, it is assumed that first to fourth non-defective product images are input, as shown in FIG. 37. Inspection objects W in the first to the fourth non-defective product images are inclined differently from each other, but the positions of the inspection objects W in the first to the fourth non-defective product images are almost the same. In these conditions, when the first to the fourth non-defective product images are superposed on one another, the most part of the inspection objects W in the first to the fourth non-defective product images superpose on one another, as shown in the difference-extracted image.

In step SG3 in the flowchart shown in FIG. 36, multiple defective product images are superposed on one another. Thereafter, a difference in feature between the non-defective product images subjected to the superposing process and the defective product images subjected to the superposing process is extracted in step SG4. This results in the difference-extracted image, as shown in FIG. 37. The positions of the inspection objects W in the first to the fourth non-defective product images are almost the same as described above, and therefore, performing the superposing process in advance narrows the region having a difference in feature between the non-defective product images and the defective product images. Thus, the inspection window 100 is made small in setting the inspection window 100 in step SG5.

Position Correction Process

Figure 38:
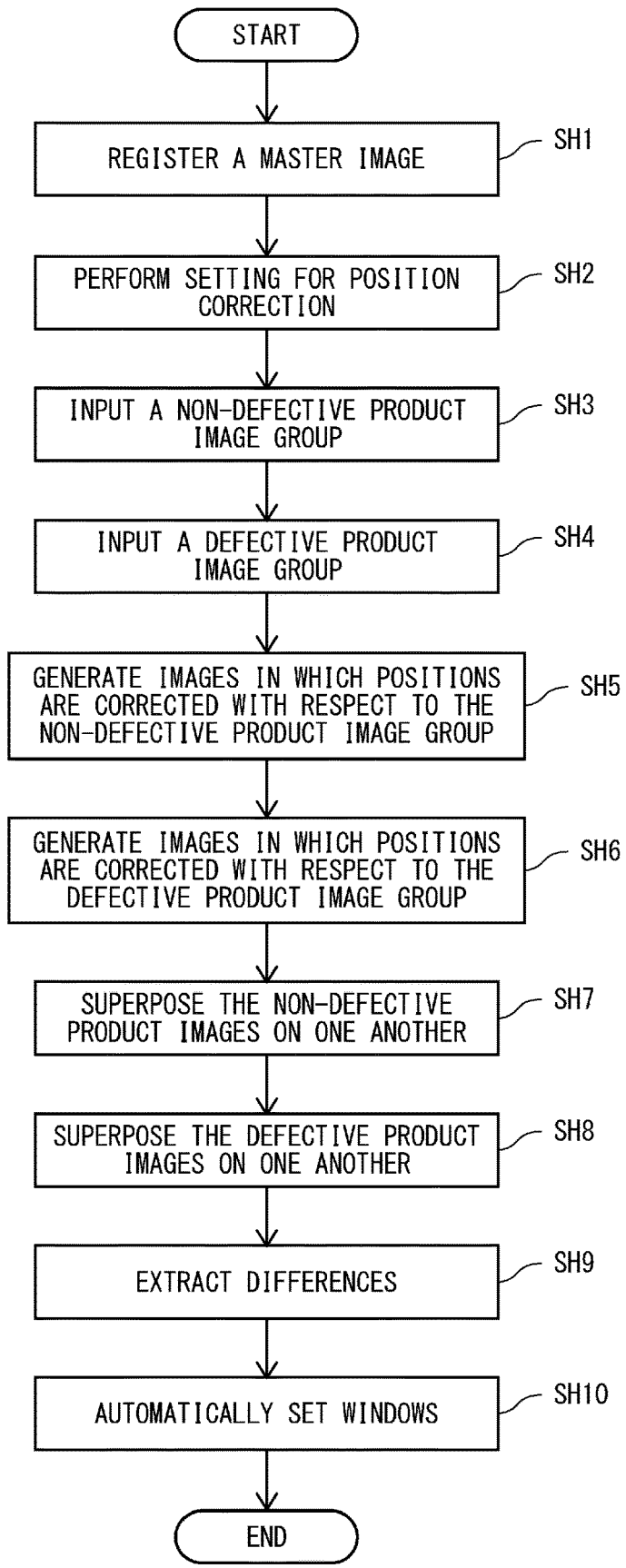
FIG. 38 is a flowchart showing a procedure in a case of performing a position correction process.

FIG. 38 is a flowchart showing a procedure in a case of performing a position correction process. In step SH1, a master image is registered. The registration of the master image is performed in a manner similar to that in step SA2 of the flowchart shown in FIG. 4. At this time, a non-defective product image containing a reference of position correction is input by the image input unit 21. For example, an image containing a reference part 101 showing a reference of position correction, as shown by the master image in FIG. 39, is used a master image. In step SH2 in the flowchart shown in FIG. 38, position correction setting is performed. Specifically, the reference part 101 in the master image is selected, and the reference part 101 is input as a reference of position correction. The reference part 101 is composed of, for example, a part having directivity, a mark, a symbol, or a character.

Multiple non-defective product images are input in step SH3. Moreover, multiple defective product images are input in step SH4. In step SH5, images are generated by correcting positions with respect to the non-defective product image group input in step SH3. As shown in FIG. 39, in the case in which the directions and the inclinations of inspection objects W in first to fourth non-defective product images differ from those of the inspection objects W in the master image, the first window setting unit 28 performs position correction to the non-defective product images on the basis of the reference part 101. For example, the directions and the inclinations of the inspection objects W in the first to the fourth non-defective product images are changed so that a specific part 101a of the reference part 101 will face immediately above the images. Thus, first to fourth position corrected images, as shown in FIG. 39, are obtained. Similarly, in step SH6 in the flowchart shown in FIG. 38, images are generated by performing position correction to the defective product image group.

In step SH7, the first to the fourth position corrected images are superposed on one another. This is the same process as in step SG2 in the flowchart in FIG. 36. In step SH8, the defective product images in which the positions are corrected are superposed on one another.

In step SH9, a difference in feature between the non-defective product images subjected to the superposing process and the defective product images subjected to the superposing process is extracted. This results in a difference-extracted image, as shown in FIG. 39. Performing the position correction process and the superposing process in advance narrows the region having a difference in feature between the non-defective product images and the defective product images. Thus, the inspection window 100 is made small in setting the inspection window 100 in step SH10.

Effects of Embodiment

As described above, the image inspection apparatus 1 according to this embodiment receives operation for extending a non-defective product range of a feature, which contributes to distinguishing, in generating a classifier by inputting a non-defective product image and a defective product image to the learning processor. In response to extension of the non-defective product range of a feature that contributes to distinguishing, an image to be determined as being a non-defective product image is newly generated by the image generator 24, and the generated image is displayed on the display device 4 while being input to the learning processor to update the classifier. This increases accuracy of the pass/fail determination of an inspection object W while reducing the burden on a user and makes the distinguished result close to the sense of distinguishing performed by a user.

In the case of adding an image for learning, the probability that the attribute of the additional image is wrong is estimated by using a feature space. When the attribute of the additional image is expected to be wrong, this probability is notified to a user. The user who receives this notice may correct the attribute of the additional image, and the correction is received to finally determine the attribute of the additional image. The classification boundary in the feature space is corrected on the basis of the finally determined attribute. Thus, erroneous input in inputting a non-defective product image and a defective product image is suppressed, thereby increasing accuracy of distinguishing between a non-defective product image and a defective product image.

The inspection window 100 is automatically set to a region having a difference in feature between a non-defective product image and a defective product image. The image in the inspection window 100 is input to the learning processor to generate a classifier. In these conditions, during operation, an inspection window 100 is automatically set on an inspection object image, the image in the inspection window 100 is input to the classifier, and the pass/fail determination is then performed. Thus, in the case in which the inspection object is contained at a part of an image, the distinguishing accuracy is improved while the burden on a user is reduced.

The forgoing embodiment is merely an illustration in every aspect and should not be limitedly understood. Moreover, all modifications and alterations belonging to equivalents of the claims are considered to fall within the scope of the present invention.

As described above, the image inspection apparatus according to the present invention can be used in performing the pass/fail determination of an inspection object on the basis of a captured image of the inspection object.

What is claimed is:

1. An image inspection apparatus for performing pass/fail determination of an inspection object on the basis of an image obtained by imaging the inspection object, the image inspection apparatus comprising:

an image input unit configured to input a non-defective product image group and a defective product image group, the non-defective product image group composed of multiple non-defective product images added with an attribute as a non-defective product by a user, the defective product image group composed of defective product images added with an attribute as a defective product by the user;

a classifier generator configured to input the non-defective product image group and the defective product image group, which are input by the image input unit, to a learning processor with a multi-layered structure, plot the non-defective product image group and the defective product image group in a feature space, and set a classification boundary between the non-defective product image group and the defective product image group plotted in the feature space, thereby generating a classifier for distinguishing between a non-defective product image and a defective product image;

a notification unit configured to, in a case in which an additional image that is added with an attribute as either one of a non-defective product and a defective product is newly input to the learning processor by the user, and the additional image is plotted in the feature space, estimate the probability that the attribute of the additional image is wrong, on the basis of a distance between the position of the additional image in the feature space and the classification boundary or a representative point of the images with the other attribute, the notification unit further configured to provide a notification of the probability of wrong attribute of the additional image when the attribute of the additional image is expected to be wrong; and a selection unit configured to receive result of selection whether to correct the attribute of the additional image, by the user who receives the notification of the probability of wrong attribute of the additional image, from the notification unit, wherein the classifier generator is configured to determine the attribute of the additional image on the basis of the result of selection received by the selection unit and to correct the classification boundary in accordance with the determined attribute.

2. The image inspection apparatus according to claim 1, wherein the notification unit is configured to expect the probability that the attribute of the additional image is wrong in a case in which the distance between the position of the additional image in the feature space and the representative point of the images with the other attribute is less than a threshold.

3. The image inspection apparatus according to claim 1, wherein the representative point is a point closest to the additional image, among the multiple images with the other attribute, which are plotted in the feature space.

4. The image inspection apparatus according to claim 1, wherein the representative point is a centroid of the multiple images with the other attribute, which are plotted in the feature space.

5. The image inspection apparatus according to claim 1, wherein the notification unit is configured to expect the probability that the attribute of the additional image is wrong, in a case in which, compared with a distance between the position of the additional image in the feature space and a representative point of the images having an attribute as either one of a non-defective product and a defective product, the distance between the position of the additional image in the feature space and the representative point of the images with the other attribute is short.

6. The image inspection apparatus according to claim 1, wherein, in a case in which the attribute of the additional image is expected to be wrong, the notification unit is configured to determine whether an image having a predetermined degree or more similarly relative to the additional image is already input by the image input unit and to not provide a notification when determining that the image is still not input.

7. The image inspection apparatus according to claim 1, wherein the notification unit is configured to add a mark that shows the probability of erroneous registration, to the additional image that is expected to have a wrong attribute, and to provide a notification when another additional image is plotted in the feature space and a similarity between the another additional image and the additional image added with the mark is determined as being a predetermined degree or more.

8. The image inspection apparatus according to claim 7, further comprising a display unit configured to display the additional image added with the mark and the another additional image having the predetermined degree or more similarly relative to the additional image added with the mark, when the notification unit provides the notification.

9. The image inspection apparatus according to claim 1, wherein the notification unit is configured to calculate a reliability on the basis of the distance between the position of the additional image in the feature space and the representative point of the images with the other attribute, and the notification unit is further configured to provide a notification that the additional image does not contribute to learning, which is performed by the learning processor, in a case in which the calculated reliability is less than a predetermined degree.

* * * * *